United States Patent [19]

Kawamura

[11] Patent Number: 5,671,087
[45] Date of Patent: Sep. 23, 1997

[54] BINOCULAR TYPE DISPLAY SYSTEM

[75] Inventor: Akira Kawamura, Kanagawa, Japan

[73] Assignee: Sony Corporation, Japan

[21] Appl. No.: 399,365

[22] Filed: Mar. 6, 1995

[30] Foreign Application Priority Data

Mar. 10, 1994 [JP] Japan .................... 6-039620

[51] Int. Cl.$^6$ ........................................ G02B 21/20
[52] U.S. Cl. ............................... 359/410; 359/417
[58] Field of Search ........................ 359/464, 466, 359/462, 410, 417, 429, 414, 411, 412

[56] References Cited

U.S. PATENT DOCUMENTS

| | | | |
|---|---|---|---|
| 4,469,415 | 9/1984 | Radl | 359/466 |
| 4,987,487 | 1/1991 | Ichinose et al. | 359/464 |
| 5,034,809 | 7/1991 | Katoh | 359/464 |
| 5,125,733 | 6/1992 | Lee | 359/462 |
| 5,129,716 | 7/1992 | Holakovszky et al. | 359/462 |
| 5,153,569 | 10/1992 | Kawamura et al. | 359/630 |
| 5,361,162 | 11/1994 | Goebel | 359/411 |

*Primary Examiner*—Timothy P. Callahan
*Assistant Examiner*—My-Trang Nu Ton
*Attorney, Agent, or Firm*—Ronald P. Kananen

[57] ABSTRACT

To relieve fatigue of viewer's eyes, a binocular display system is equipped with a mechanical or electrical adjusting section for minimizing a separation between left and right virtual images for the left and right eyes. The adjusting section holds the arrangement of the four positions of left and right lenses (or curved mirrors) and left and right pictures produced by at least one display device in such a manner as to reduce the separation between the left and right virtual images of the left and right picture substantially to zero, and/or adjusts the arrangement of these four positions to move the left and right virtual images in a desired direction so that the left and right images remain optically coincident.

33 Claims, 20 Drawing Sheets

LEFT PICTURE AT NEAR POSITION

RIGHT PICTURE AT NEAR POSITION

LEFT AND RIGHT IMAGES IN NEAR ZONE P1

LEFT AND RIGHT
IMAGES IN MIDDLE
ZONE P2

LEFT AND RIGHT
IMAGES IN FAR
ZONE P3

BINOCULAR TYPE DISPLAY SYSTEM

BACKGROUND OF THE INVENTION

1. Field of the Invention

The present invention relates to a display system suitable for implementing virtual reality, representation of stereoscopic imagery or the like, and more specifically to a wearable display instrument of an eyeglasses type inclusive of a goggle type and a helmet type.

2. Description of the Related Art

FIG. 27 shows an example of related art. In an eyeglasses type display system of this example, left and right lenses 2 and 3 are arranged so that their optical axes 5 and 6 cross at a position K at a predetermined distance, and left and right display panels 5 and 6 of LCD are positioned on the respective optical axes 37 and 38. This system enables an adjustment of each display panel 5 or 6 along the optical axis 37 or 38 as shown by arrows A and B in FIG. 27.

In this arrangement, the intersection point K of the optical axes 37 and 38 is ideal as the locations of left and right virtual images 7E and 8E of left and right pictures produced on the left and right LCD panels 5 and 6. It is difficult, however, to produce the virtual images 7E and 8E at this ideal position K. In practice, the left and right virtual images 7E and 8E are apart from the intersection point K, and hence both images are separated from each other.

The separate images are uncomfortable to the viewer, and tend to hasten fatigue of the eyes because of disagreement of directions of the eyeballs and adjustment of the crystalline lenses.

As shown in FIG. 28, the virtual images 7E and 8E are formed right in front of the human face 99 of a wearer. The wearer can shift the images up and down by moving the display manually.

In this system, however, the wearer of this instrument cannot shift the images up and down or left and right without moving the instrument as a whole, and the images are always formed closely and directly in front of the eyes. The wearer cannot take a rest by shifting the images aside.

An eyeglasses type display system 31A shown in FIG. 29 has a casing 34A enclosing an optical block of lenses 2 and 3 and display panels 5 and 6, and a headband 33 holding the casing 34A in front of the face 33 of a wearer. To see surroundings, the wearer must raise the casing 34A by hand. This operation is troublesome. Moreover, the casing obstructs sight of the outside, and isolates the wearer somewhat like a blindfold, so that the wearer tends to feel uneasy.

In a display system, shown in FIG. 30, having a half mirror 9, the viewer can view the virtual images 7E ad 8E reflected by the half mirror 9. This system suffers the same problems.

A European Patent Application, published under Publication No. 0575257 on Dec. 22, 1993 and its corresponding U.S. Pat. No. 5,486,841 (U.S. Pat. No. '841) published Jan. 23, 1996 in the name of Hara et al., disclose a similar display system.

SUMMARY OF THE INVENTION

It is therefore an object of the present invention to provide a display system which can present images agreeable to both eyes.

According to the present invention, a display system comprises a display section displaying left and right pictures; an optical system for producing a left virtual image of said left picture and a right virtual image of said right picture; and an image adjusting means for reducing a separation between the left and right virtual images.

In some examples according to the present invention, the image adjusting means is a means for making the left and right virtual images optically coincident at one desired position or at a plurality of different positions, or a means for moving said left and right virtual images of said left and right pictures while preventing said separation between the left and right virtual images from being increased. The image adjusting means of the present invention may be an electrical means or a mechanical means.

In illustrated examples of the present invention, the optical system comprises left and right lenses or curved mirrors having optical axes which may be parallel to each other, or may be in the form of intersectant lines. The optical system of the present invention may further comprise a half mirror. The display system according to the present invention may further comprise an optical filter for controlling the background brightness.

In the illustrated example of the present invention, the display system is portable and wearable. The display system may comprises a head member such as a headband or a head covering.

The display system according to the present invention can minimize the separation between left and right images, and make the optical locations of the left and right images substantially coincident. Therefore, the system according to the present invention can remove unbalance of the directions of eyeballs and focusing of the crystalline lenses, and relieve the fatigue of the eyes.

By enabling adjustment of the positions of the virtual images, the system according to the present invention can eliminate a sense of oppression by images formed closely and directly in front of the eyes, and improve the comfort.

The adjustment can be readily done electrically or mechanically without moving the casing or the headband. It is further possible to move the positions of the virtual images automatically in accordance with movement of the eyeballs.

The system of the present invention can relieve the viewer of a feeling of unease by offering sight of the outside simultaneously with the presentation of the displayed images.

With the optical filter controlling the brightness, the display system can present clear images even in a bright environment.

DESCRIPTION OF THE PREFERRED EMBODIMENTS

Figure 1:
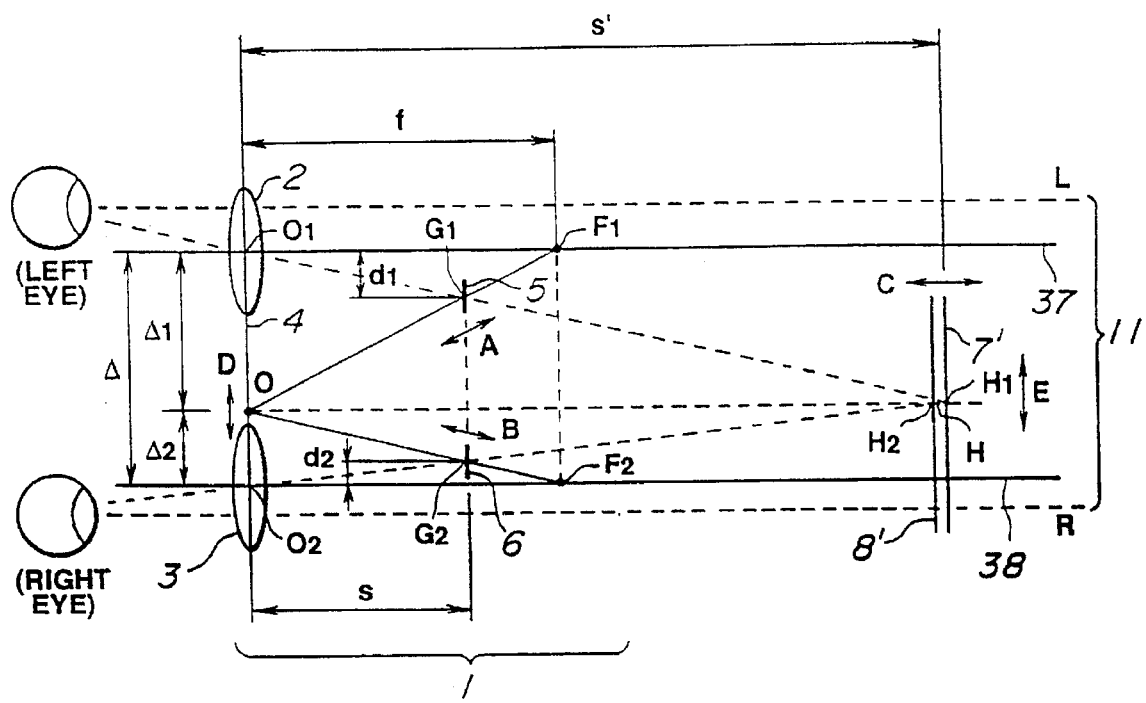
FIG. 1 is a schematic horizontal sectional view showing a basic arrangement according to a first embodiment of the present invention.

FIG. 1 shows a basic arrangement of left and right optical members and left and right pictures according to a first embodiment of the present invention.

As shown in FIG. 1, a display system, such as an eyeglasses type display system has an optical block 1.

The optical block 1 comprises an optical system and a display section. The optical system of this example includes left and right optical members 2 and 3 which, in this example of FIG. 1, are left and right lenses. In this example, each lens is a double convex lens. The display section of this example includes left and right display devices 5 and 6 having left and right screens, respectively. In this example, the left and right display devices are left and right display panels 5 and 6. This optical block 1 is attached to a head member such as a head band 33 shown in FIG. 5, and is designed to be worn by a viewer. When the optical block is correctly worn by the viewer, the left lens 2 confronts the left eye, and the right lens 3 is just in front of the right eye like a pair of eyeglasses. The left and right lenses 2 and 3 are spaced at a distance $\Delta$ corresponding to the distance between left and right human eyes. This distance $\Delta$ is hereinafter referred to as a left and right optical member separation. In this example employing the lenses, this separation is a left and right lens separation. This optical block 1 is a binocular instrument designed to present images for both eyes through the left and right lenses 2 and 3.

In the example, each of the left and right optical members 2 and 3 is a radially symmetrical member, and the optical axes 37 and 38 of the left and right radially symmetrical optical members 2 and 3 are parallel to each other. In this example, the left and right optical members 2 and 3 are arranged symmetrically in a manner of bilateral symmetry with respect to a predetermined imaginary optical median plane. The left optical member 2 comprises at least one principal points $O_1$ lying on a (common) principal plane perpendicular to the left optical axis 38. Similarly, the right optical member 3 comprises at least one principal point $O_2$, which, in this example, lies on the same (common) principal plane 4. The focal distances f of the left and right optical members 2 and 3 of this example are equal to each other. Focal points $F_1$ and $F_2$ of the left and right lenses 2 and 3 shown in FIG. 1 are located on a common focal plane perpendicular to the optical axes 37 and 38.

The left and right display panels 5 and 6 of this example are placed in a common plane (called a common object picture plane) which is parallel to the common principal plane 4 and at an object picture distance s apart from the common principal plane 4. Each of the left and right display panels 5 and 6 is parallel to the principal plane 4. In particular, each display panel of this example has a substantially flat screen which is parallel to the common principal plane 4 and coplanar with the screen of the other display panel.

A common point O shown in FIG. 1 lies on a straight line passing through both of the left and right principal points $O_1$ and $O_2$. In this example, the common point O is adjustable and movable along this straight line connecting the principal points $O_1$ and $O_2$ on the common principal plane 4. The left display panel 5 is movable along a left (normally oblique) straight line segment $OF_1$ connecting the adjustable common point O and the focal point $F_1$ of the left optical member 2. The right display panel 6 is movable along a right (normally oblique) straight line segment $OF_2$ connecting the adjustable point O and the focal point $F_2$. In this example, the left straight line segment $OF_1$ always passes through the center $G_1$ of the substantially rectangular screen of the left display panel 5. The center $G_2$ of the screen of the right display panel 6 is held likewise on the right straight line segment $OF_2$. The left and right display panels 5 and 6 are thus movable, respectively, along the line segments $OF_1$ and OF2 so that the first and second display panels 5 and 6 remain parallel to the common principal plane 4, and that the centers G1 and G2 of the left and right panels 5 and 6 are on the respective line segments OF1 and OF2. The line segment OF1 is normally oblique, but it is not oblique when the common point O is coincident with the principal point O1. In this case, the line segment OF1 is coincident with the optical axis 37 and perpendicular to the common principal plane 4. In the same sense, the line segment OF2 is normally oblique.

In this way, the object distance s between the common principal plane 4 and the common object plane defined by the left and right screens is variable. In this example, the left and right display panels 5 and 6 are bilaterally symmetrically arranged with respect to an imaginary display median plane. The display median plane is coincide with the optical median plane when the common point is exactly at the middle between the left and right principal points O1 and O2.

In the thus constructed optical block 1, the left eye can view, through the left lens 2, a magnified virtual image 7' of the picture of the left display panel 5, and the right eye can view, through the right lens 3, a magnified virtual image 8' of the picture of the right display panel 6.

This system can move the virtual images 7' and 8' viewed by the left and right eyes along the far and near direction and the left and right direction while the virtual images 7' and 8' are held coincident optically at the same position. This system is suitable for a realistic simulation known as virtual reality. This system makes it possible to move the virtual images for the left and right eyes farther and nearer along the far and near direction (or fore and aft direction) by moving the centers G1 and G2 of the left and right display panels 5 and 6 along the respective line segments OF1 and OF2. In this way, it is possible to move the centers H1 and H2 of the left and right virtual images 7' and 8' formed from the left and right pictures of one frame on the screens of the left and right display panels 5 and 6, along the far and near direction perpendicular to the common principal plane 4. That is, it is possible to vary an image distance (or image distances) s' of the virtual images 7' and 8' from the common principal plane 4 by varying the object picture distance s of the common object picture plane of the left and right display panels 5 and 6 from the common principal plane 4.

This system further enables a change of the locations of the virtual images 7' and 8' of the left and right eyes in the left and right direction by moving the adjustable common point O left and right along a straight line segment O1O2 extending between the principal points O1 and O2 in the common principal plane 4. In this way, it is possible to move the centers H1 and H2 of the left and right virtual images 7' and 8' along the left and right direction which is parallel to the common principal plane 4, and parallel to the common axial plane containing both optical axes 38 and 37.

This system can perform these movements of the left and right virtual images while holding the left and right images coincident in space, or holding the centers H1 and H2 at the same position H, for the following reasons.

First, in the example shown in FIG. 1, the left and right object picture centers (or screen centers) G1 and G2 are both located on the common axial plane containing both optical axes 38 and 37, and therefore, the left and right image centers H1 and H2 are both located on the same common axial plane.

Second, the object picture centers G1 and G2 are held in the common object picture plane parallel to the common principal plane 4, and accordingly, the object distance (s) of the left object center G1 from the common principal plane 4 and the object distance (s) of the right object center G2 are equal to each other. As a result, the image distance (s') of the left virtual image center H1 from the common principal plane 4 and the image distance (s') of the right virtual image center H2 are equal to each other. The left and right virtual image centers H1 and H2 both lie on the common image plane parallel to the common principal plane.

Third, the left virtual image center H1 and the right virtual image center H2 are both located on a straight line segment OH for the following reason. In the example shown in FIG. 1, this line segment OH is parallel to the left and right optical axes 38.

One end point of this line segment OH is the common point O which is at a distance $\Delta_1$ from the principal point O1 and at a distance $\Delta_2$ from the principal point O2. Therefore, $$\Delta = \Delta_1 + \Delta_2 \tag{1}$$

The lateral magnification m of the left lens 2 is:

$$m = f/(f-s) \tag{2}$$

In this equation, f is the focal distance of the left lens 2 from the principal point O1 to the focal point F1, s is the object distance which is the distance between the principal plane 4 and the screen of the left display panel 5. In FIG. 1, d1 is a distance between the center G1 of the left display panel 5 and the left optical axis 38. This distance d1 is a point-line distance equal to the length of the perpendicular (line segment) from the point to the line of the optical axis. In this case, a distance d1' of the left virtual image center H1 from the left optical axis 38 is given by:

$$d_1' = md_1 \tag{3}$$

Substitution of the equation (2) into the equation (3) yields:

$$d_1' = \frac{f}{(f-s)} d_1 \tag{4}$$

On the other hand, the perpendicular line segment from the point G1 to the left optical axis 38 is parallel to the side O1O of the right triangle formed by the three points O1, F1 and O as shown in FIG. 1. In this triangle, a ratio of (f–s) to f is equal to a ratio of d1 to $\Delta_1$. Therefore the following equation (4') is obtained if the point G1 is on the side F1O.

$$\Delta_1 = \frac{f}{(f-s)} d_1 \tag{4'}$$

From the equations (4) and (4'), it is evident that the distance d1' is equal to the distance $\Delta_1$ as long as the point G1 is on the line segment F1O.

An analogous process provides:

$$d_2' = \Delta_2 = \frac{f}{(f-s)} d_2 \tag{5}$$

As evident from the equations (4), (4') and (5), the left virtual image center H1 and the right virtual image center H2 are both located on the line OH (that is, at the same point H) when the object picture centers G1 and G2 are on the respective line segments OF1 and OF2 and the object distances s of the left and right pictures are equal to each other.

Since the image centers H1 and H2 lie not only on the common image plane perpendicular to the common axial plane, but also on the line OH in the common axial plane, the image centers H1 and H2 are coincident at the same point H.

In this way, this system can make and hold the left and right virtual images 7' and 8' coincident at the same common image position H on the line segment OH. Moreover, this system can move the common image position H of the left and right images in the far and near direction, as shown in an arrow C in FIG. 1, perpendicular to the common principal plane 4 by moving the common picture plane in the far and near direction perpendicular to the common principal plane 4. The system further makes it possible to move the common image position H in the left and right direction, as shown by an arrow E in FIG. 1, by subjecting the image locating line segment OH to translation (or linear movement) along the left and right direction. The common point O may move beyond the principal point $O_1$ or $O_2$ and the line segment OH may be placed outside the region between the left and right optical axes 38 and 37.

With this arrangement, the viewer can view the left and right virtual images which are well-defined, natural and comfortable, at a desired position.

Figure 2:
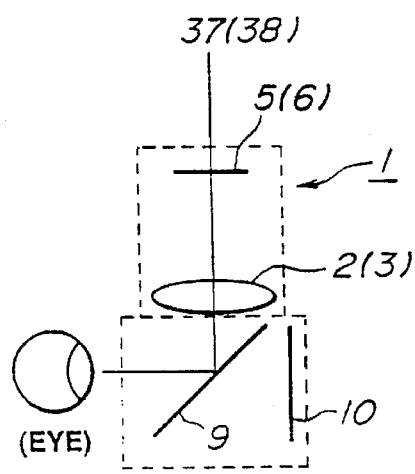
FIG. 2 is a schematic vertical sectional view showing a modified arrangement employing a half mirror, according to the first embodiment.

In the example shown in FIG. 1, the optical axes 37 and 38 are placed in parallel to a line L of sight of the observer's left eye, and a line R of sight of the observer's right eye. In an example shown in FIG. 2, however, the optical axes 37 and 38 are placed so as to form an angle with the lines of sight, with the interposition of a half mirror. In the illustrated example of FIG. 2, this angle between the optical axes 37 and 38 and the lines of sight are a right angle, and the half mirror 9 is at 45°. In this example, the angle between the common axial plane and the flat mirror surface is 45°, and the common axial plane is vertical. The lenses 2 and 3 are placed between the half mirror 9 and the display section of the left and right display panels 5 and 6. In the example of FIG. 2, there is further provided an optical filter 10 for reducing or absorbing light and controlling the brightness. With this arrangement, the viewer can watch the virtual images reflected from the half mirror 9, and see the outside through the half mirror 9. In this example, the filter 10 is a liquid crystal shutter, and the half mirror 9 is placed between the position of the viewer's eyes, and the filter 10. The filter 10 makes the virtual images more readily visible even when the outside is bright.

Figure 3:
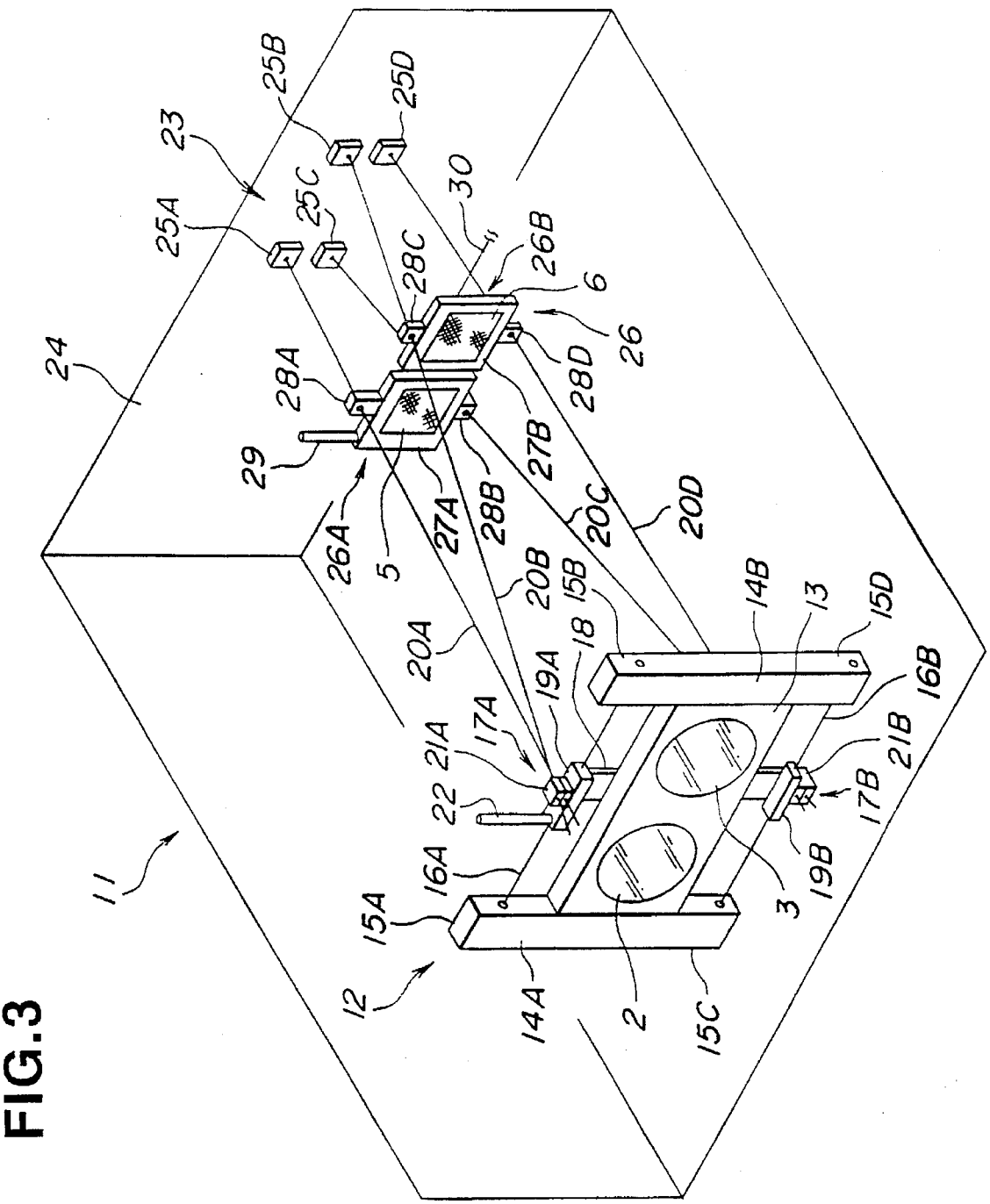
FIG. 3 is a perspective view showing an adjusting mechanism which can be employed in the first embodiment.
Figure 4:
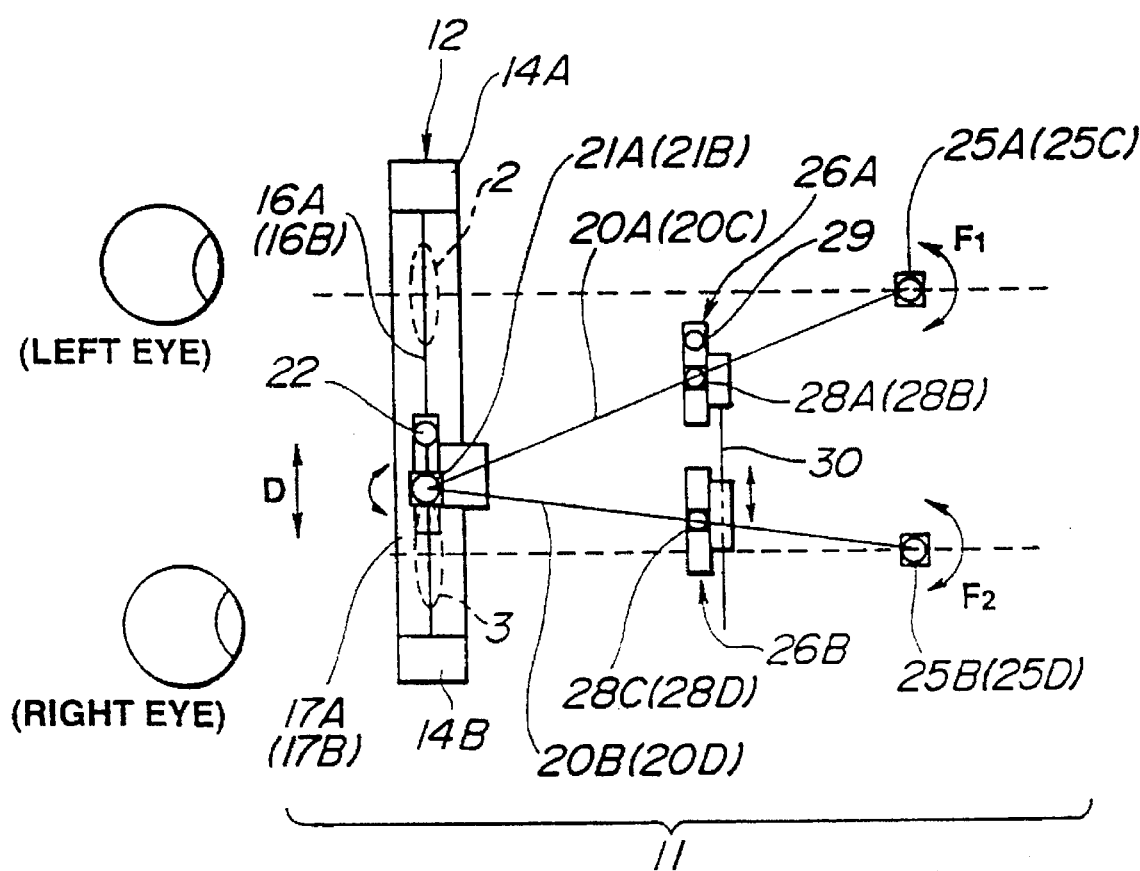
FIG. 4 is a schematic plan view showing the adjusting mechanism of FIG. 3.

FIGS. 3 and 4 show an adjusting mechanism 11 based on the principle of the optical block shown in FIG. 1. The adjusting mechanism 11 of the example shown in FIGS. 3 and 4 comprises a lens unit 12 and a display unit 26. This adjusting mechanism 11 further includes a set of oblique guide members 20A, 20B, 20C and 20D which, in this example, are piano wires, and a guide support 23 for supporting the far ends of the guide wires 20A, 20B, 20C and 20D.

The lens unit 12 of this example comprises an H-shaped frame composed of left and right upright members 14A and 14B and a rectangular holder member 13 extending along the left and right direction, like the cross bar of a capital H, between the middles of the left and right upright members 14A and 14B. The lens unit 12 of this example further includes cross guide members 16A and 16B which, in this example, are piano wires, and slide members 17A and 17B which are mounted, respectively, on the guide wires 16A and 16B, and which are slidable along the left and right direction.

The left and right lenses 2 and 3 are supported by the lens holder member 13. The left and right lenses 2 and 3 are spaced so as to define the predetermined lens separation (Δ) between the principal points $O_1$ and $O_2$. The lens unit 12 of this example is stationary relative to the casing, and holds the optical axes 37 and 38 of both lenses parallel to each other, and the principal points $O_1$ and $O_2$ on the common principal plane 4.

The left and right upright members 14A and 14B are fixed to the left and right sides of the lens holder member 13, respectively. Each of the upright members 14A and 14B has an upper portion 15A or 15B projecting upward above the lens holder member 13, and a lower portion 15C or 15D projecting downward below the lens holder member 13. The guide wire 16A is stretched between the upper portions 15A and 15B of the left and right upright members 14A and 14B, and the guide wire 16B is stretched between the left and right lower portions 15C and 15D. The guide wires 16A and 16B are substantially straight, and parallel to the straight line segment $O_1O_2$ between both principal points $O_1$ and $O_2$.

The slide member 17A is slidably mounted on the upper guide wire 16A, and the slide member 17B is slidable on the lower guide wire 16B. The upper and lower slide members 17A and 17B are connected by a vertically extending connecting member 18. The upper and lower slide members 17A and 17B move as an integral unit in the left and right direction.

Each of the slide members 17A and 17B comprises a base 19A or 19B having a hole through which the corresponding guide wire 16A or 16B passes, and a guide retainer 21A or 21B, fixedly mounted on the base, for holding the guide wires 20A, 20B, 20C and 20D. The upper slide member 17A further has a knob 22 in the form of a rod projecting upward.

The focal distances f of both lenses are equal, in this example. The distance between the guide support 23 and the principal plane 4 is determined by the focal distance f. The guide support 23 holds the far ends of the guide wires 20A, 20B, 20C and 20D in the common focal plane. The guide support 23 is provided on an inside wall surface of a casing. The guide support 23 comprises first, second, third and fourth guide retainers 25A, 25B, 25C and 25D for holding the far ends of the guide wires 20A, 20B, 20C and 20D. The guide wires are tensely stretched taut between the slide members 17A and 17B and the guide support 23.

The guide retainers 25A, 25B, 25C and 25D are so arranged to hold the far ends of the guide wires 20A, 20B, 20C and 20D all located in the common focal plane which is perpendicular to the parallel optical axes of the left and right lenses 2 and 3, and passing through the focal points of the left and right lenses 2 and 3 having the same focal distance f. In this example, the guide wires 20A-20D are all parallel to the common axial plane defined by the optical axes 37 and 38. The wires 20A and 20B are above the common axial plane, and the wires 20C and 20D are below. These four guide wires 20A-20D are placed so that, in a plan view, they appear as the lines segments $OF_1$ and $OF_2$ shown in FIG. 1. The far ends of the first and third guide wires 20A and 20C lie on the same vertical straight line passing through the focal point $F_1$ of the left lens 2. Similarly, the far ends of the second and fourth guide wires 20B and 20D are collinear on the same vertical straight line passing through the focal point $F_2$ of the right lens 3.

The display unit 26 comprises left and right frame members 26A and 26B supporting the left and right display panels 5 and 6. The display panels 5 and 6 in this example are LCD panels.

Each of the left and right frame members 26A and 26B has a rectangular frame 27A or 27B enclosing the display panel 5 or 6, and upper and lower projections 28A or 28C and 28B or 28D. In each frame member, the upper projection 28A or 28C projects upward from the upper middle of the frame 27A or 27B, and the lower projection 28B or 28D projects downward from the lower middle of the frame 27A or 27B. Each of the projections 28A~28D is formed with a hole through which one of the guide wires 20A~20D passes.

The left frame member 26A has a knob 29 which is in the form of a rod and which projects upward from the top of the frame 27A on the left side of the projection 28A.

The left and right panel frame members 26A and 26B are connected with each other through a guide member 30 which, in this example, is a piano wire. The display unit 26 is thus slidably mounted on the guide wires 20A~20D. By operating the knob 29, it is possible to move the display unit 26 back and forth, toward and away from the lens holder unit 12, while the left and right display panels 5 and 6 remain parallel to the principal plane 4 of the left and right lenses 2 and 3.

It is possible to hold the left and right display panels 5 and 6 in the same object plane with various guide mechanisms. For example, the left and right frame members 26A and 26B are slidably mounted on a carrier which holds the left and right frame members in parallel to the common principal plane 4, and which is formed with guide rails or guide grooves extending in the left and right direction and allowing the left and right frame members to slide in the left and right direction on the carrier. This carrier is supported in the casing, and slidable along the far and near direction by the aid of guide rails or guide grooves (such as items 71a~71d shown in FIG. 16) which extend along the far and near direction and which is formed in the casing or in a stationary member fixed to the casing.

Instead of piano wire, it is possible to employ, as the guide wires 16A, 16B, 20A~20D and 30, carbon fiber, glass fiber or natural fiber.

In the example shown in FIGS. 3 and 4, the adjusting mechanism 11 serves as an image adjusting means for moving the left and right virtual images while both images are held substantially coincident, the knob 29 serves as a first adjusting means for varying a first parameter which is the object distance, the guide wires 20A~20D serves as a second adjusting means for varying a second parameter which, in this example, may be the separation between the screen center G1 of the left display panel and the screen center G2 of the right display panel 6, the guide wires 16A and 16B and the slider members 17A and 17B serve as a third adjusting means for moving the left and right virtual images along the left and right direction.

Figure 5:
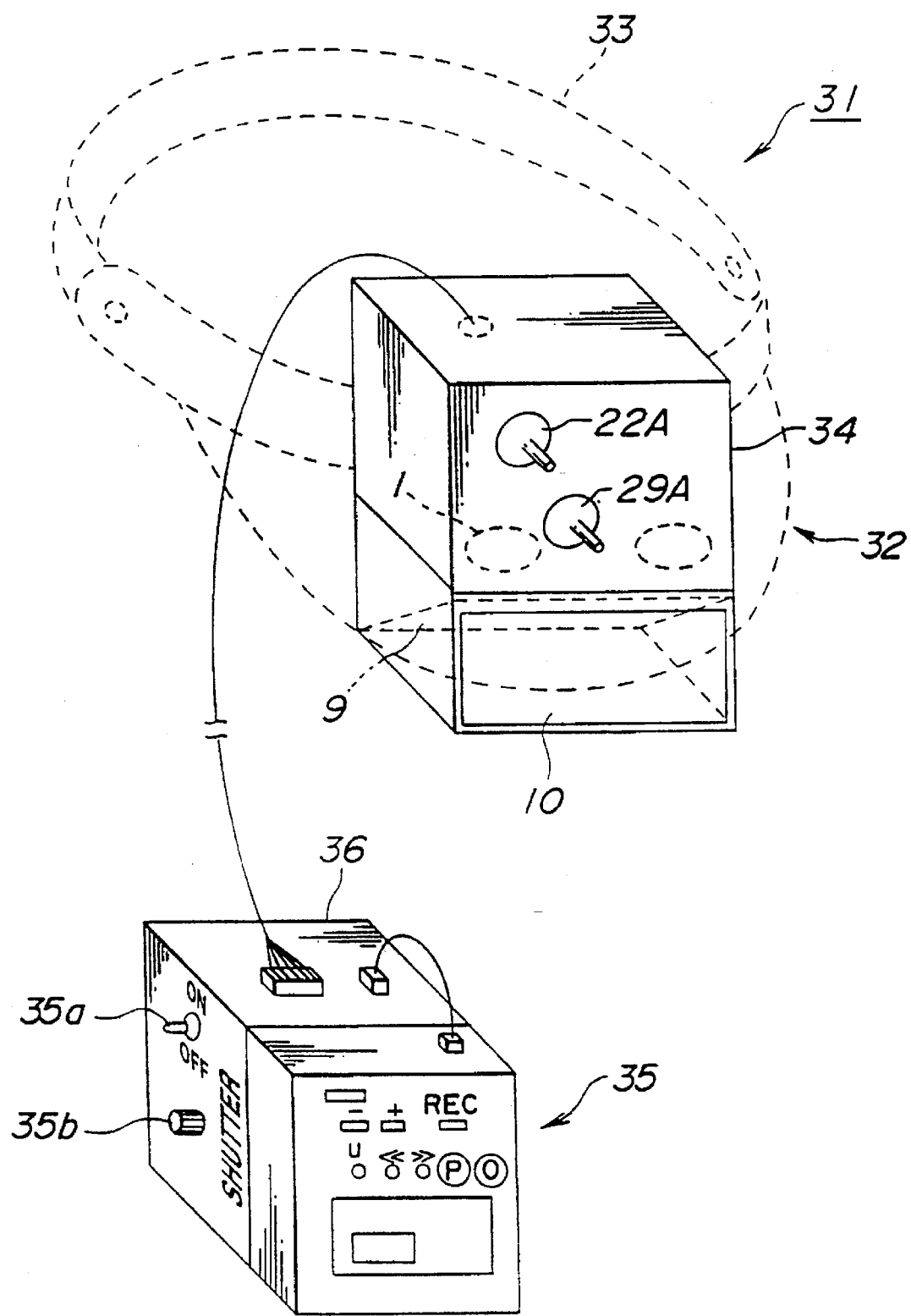
FIG. 5 is a perspective view showing a display system including a control unit, a head band, and an optical block having the modified arrangement shown in FIG. 2.

The above-mentioned optical block and adjusting mechanism is applicable to an eyeglasses type display instrument and display instruments of various other types. FIG. 5 shows one example. A display system 31 shown in FIG. 5 comprises a headset 32, a casing 34 and a control unit 35. The casing 34 is mounted on the headset 32, which is an attachment for holding the casing 34 in position at the viewer's head. The headset 32 of this example comprises a headband 33 designed to hold the casing 34 just in front of the left and right eyes.

The casing 34 encloses the optical block 1 including the left and right lenses 2 and 3 and the left and right display panels 5 and 6. There are provided adjusting knobs 22A and 29A for adjusting the image locations, and making the left and right virtual images coincident. In this example, the knobs 22A and 29A project forward from the casing 34. The knob 22A is arranged to move the virtual images left and right, and connected with the knob 22 shown in FIG. 3. The knob 29A is connected with the knob 29, and arranged to move the virtual images back and forth along the far and near direction.

The system of the example shown in FIG. 5 includes a half mirror or beam splitter 9. In this example, the half mirror 9 is enclosed in the lower portion of the casing 34, under the lenses and the display panels. The wearer can view the virtual images of the pictures on the display panels, reflected from the half mirror 9. The viewer can further view the outside through the half mirror 9.

In this example, there is further provided a liquid crystal shutter 10 for attenuating light from the outside and making the images more visible even if the outside is too bright. The liquid crystal shutter 10 is disposed in the lower portion of the casing 34, in front of the half mirror 9, as shown in FIG. 2. The liquid crystal shutter 10 is disposed in a window formed in the casing 34.

The control unit 35 has a control circuit 36 for controlling the left and right display panels 5 and 6, and the liquid crystal shutter 10. There are further provided a switch 35a for switching on and off the images, and a volume control knob 35b for controlling the transmittance of the liquid crystal shutter 10. The control unit 35 is adapted to be carried by the viewer so that the viewer can use the display system while walking. The control unit 35 may have an attachment, such as a waist belt or a shoulder strap, for attaching the control unit 35 to a part of the human body.

Figure 6:
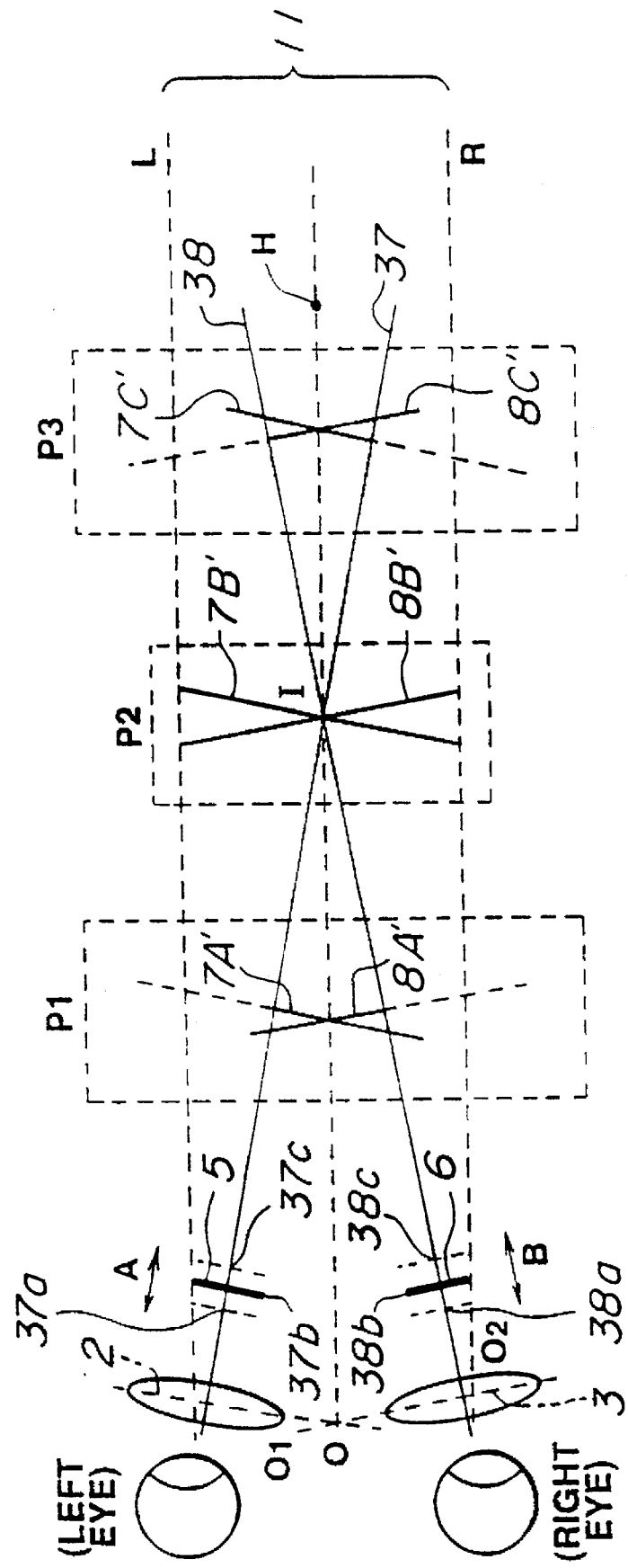
FIG. 6 is a schematic horizontal sectional view showing a basic arrangement according to a second embodiment of the present invention.

FIG. 6 shows a basic arrangement of an optical block 1A according to a second embodiment of the present invention. In the second embodiment, the optical axes 37 and 38 of the left and right lenses 2 and 3 intersects each other at an axial intersection point I. The left display panel 5 is held perpendicular to the left optical axis 37 of the left lens 2, and the right panel 6 is perpendicular to the right optical axis 38. The left and right display panels 5 and 6 are axially movable along the respective optical axes as shown by A and B in FIG. 6 while the left and right panels 5 and 6 remain perpendicular to the optical axes 37 and 38, respectively, and the object picture distance of the left panel 5 from the left lens 2 and the object distance of the right panel 6 from the right lens 3 remain equal to each other. The left display panel 5 is located between the left lens 2 and the intersection point I, and the right display panel 6 is between the right lens 3 and the intersection point I.

When, for example, the left and right display panels 5 and 6 are at respective near positions 37a and 38a shown in FIG. 6, then the left and right virtual images 7A' and 8A' are formed in a near zone P1 located between the intersection point I and the display panels 5 and 6. When the display panels 5 and 6 are at respective far positions 37c and 38c, the virtual images 7C' and 8C' are in a far zone P3 which is remoter from the lenses 2 and 3 than the intersection point I is. When the display panels 5 and 6 and at predetermined middle positions 37b and 38b, then the left and right virtual images 7B' and 8B' are formed at the intersection point I in a middle zone P2. The positions 37a, 37b and 37c are collinear on the left optical axis 37 and the middle position 37b is between the near and far positions 37a and 37c along the optical axis 37. Similarly, the middle position 38b is between the near and far positions 38a and 38c on the right optical axis 38.

If, in this intersecting arrangement of the left and right optical axes, the pictures were displayed in the entire areas of the screens, the left and right images would move apart from each other with axial movement of the display panels 5 and 6 along the respective optical axes 37 and 38.

The display system of this example according to the second embodiment is arranged to prevent this separation of the left and right images by shifting the center of the picture on each display panel 5 or 6 in the left and right direction relative to the display panel 5 or 6.

Figure 7:
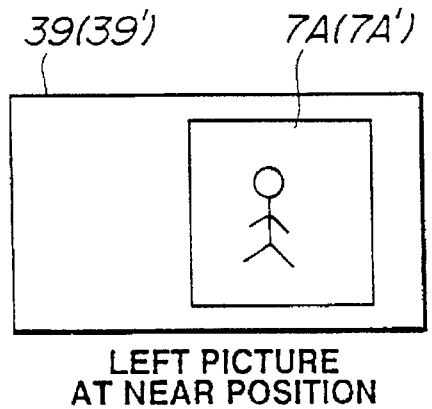
FIG. 7 is a view showing a picture 7A on a left display panel 5 at a near position 37a shown in FIG. 6, and a virtual image 7A' in a near zone P1 shown in FIG. 6.
Figure 8:
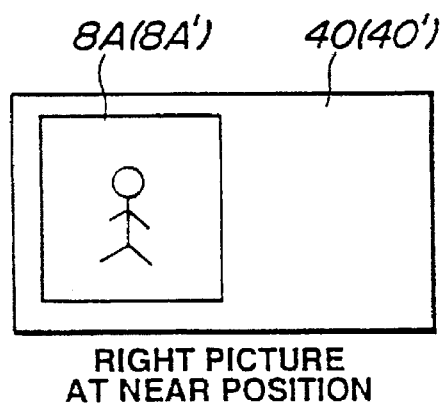
FIG. 8 is a view showing a picture 8A on a right display panel 6 at a near position 38a shown in FIG. 6, and a virtual image 8A' in the near zone P1.

In the near positions 37a and 38a of the left and right panels 5 and 6, this display system produces the left picture 7A in a right portion of the screen area 39 of the left display panel 5, and the right picture 8A in a left portion of the screen area 40 of the right display 6, as shown in FIGS. 7 and 8. Therefore, the left virtual image 7A' is formed in a right potion of an image area 39' which the left eye can view, and the right image 8A' is in a left portion of an image area 40' for the right eye can view, as shown in FIGS. 7 and 8.

Figure 9:
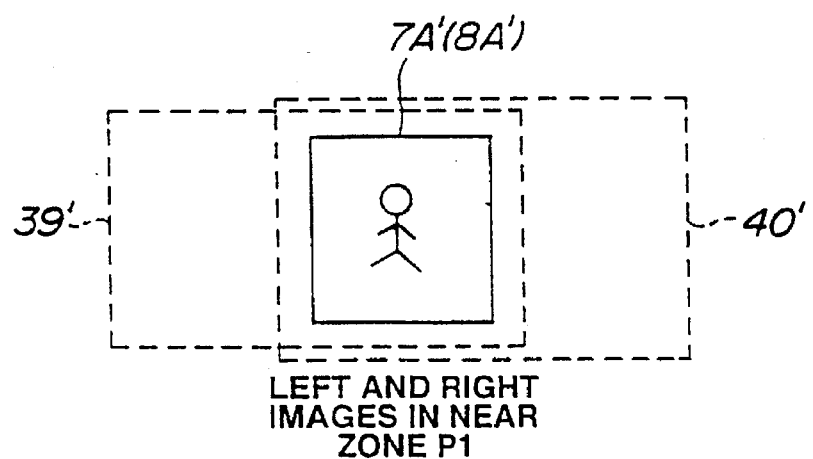
FIG. 9 shows the left and right virtual images 7A' and 8A' in the near zone P1, as viewed with both eyes.

As a result, the viewer can view, with both eyes, the left and right virtual images 7A' and 8A' which are centered at the same position in the union area formed by uniting the left and right eyes' image areas 39' and 40 as shown in FIG. 9.

Figure 10:
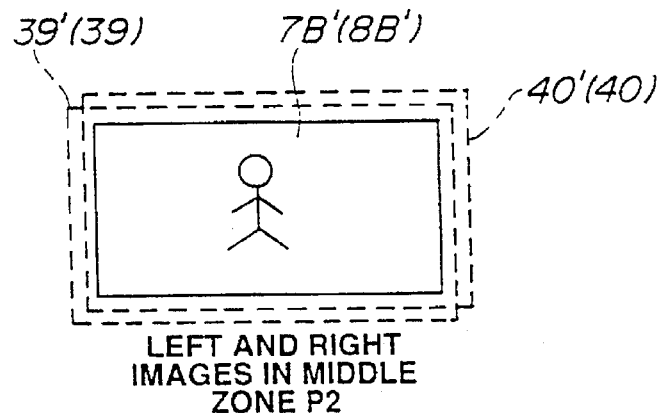
FIG. 10 shows left and right virtual images 7B and 8B formed at a position at which the optical axes of left and right lenses 2 and 3 intersect.

When the left and right display panels 5 and 6 are placed at the respective middle positions 37b and 38b, this display system presents the picture in the entire screen area 39 or 40 of each of the left and right display panels 5 and 6. Therefore, the left and right virtual images 7B' and 8B' are formed at the intersection point I in the middle zone P2, and the viewer can view the left and right virtual images 7B' and 8B' in agreement in the entire areas 39' and 40' as shown in FIG. 10.

Figure 11:
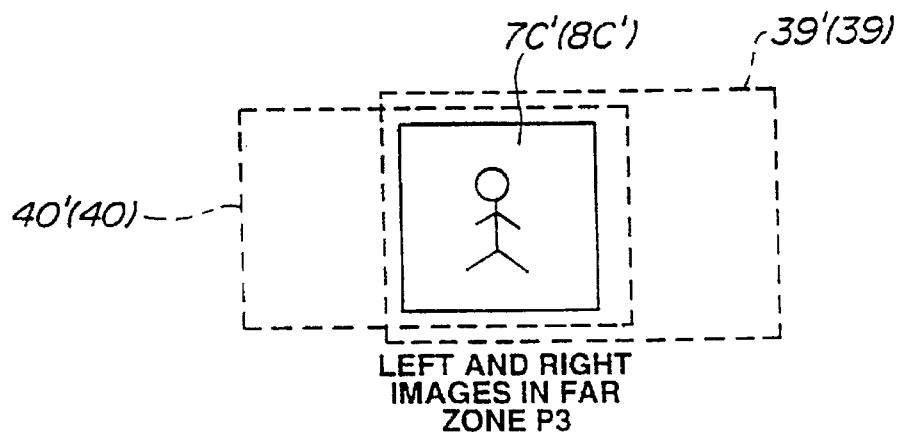
FIG. 11 is a view showing left and right virtual images 7C and 8C in a far zone P3 shown in FIG. 6.

When the left and right display panels 5 and 6 are placed at the respective far positions 37c and 38c, the left picture 7C is displayed in the left side of the left screen area 39 to form the left virtual image 7C' in the left side of the left eye's image area 39' in the far zone P3, and the right picture 8C is displayed in the right side of the right screen area 40 to form the right virtual image 8C' in the right side of the right eye's visual image area 40', as shown in FIG. 11. As a result, the left and right virtual images 7C' and 8C' are coincident in the central region as shown in FIG. 11.

In this example, the left and right display panels 5 and 6 are arranged symmetrically with respect to an imaginary display median plane which appears as a line OH in FIG. 6, and the left and right lenses 2 and 3 are also symmetrical with respect to this median plane. The center of the picture frame in each display panel is shifted, relative to the screen, inboard toward the display median plane when the display panel is moved toward the lens. The picture frame is one complete coverage of a picture, such as a frame of a television picture, and the picture frame is substantially rectangular in the example shown in FIGS. 7 and 8. When each display panel is moved away from the lens, the picture frame center in each display panel is shift outboard away from the median plane. In the example shown in FIGS. 7~11, the width of the left and right picture frames is varied, and the frame width is greater at the middle positions than at the near and far positions.

In this way, the system of this example according to the second embodiment can always minimize the image separation between the left and right virtual images by varying the object picture separation between the center of the left picture (or the center of the left picture frame) and the center of the right picture (or the center of the right picture frame) in accordance with the picture-lens distance (called object distance). Thus, this system makes it possible to move the left and right virtual images in the far and near direction while the left and right images are held substantially coincident.

This system further makes it possible to move the left and right images by moving the centers of the left and right pictures simultaneously, relative to the left and right screens along the left and right direction so that the left and right virtual images remain coincident. Moreover, it is possible to move the left and right virtual images up and down by moving the left and right pictures simultaneously along the up and down direction, relative to the left and right screens while the left and right images remain coincident. In these cases, the displacements of the centers of the left and right pictures within the screen areas are determined so that the left and right virtual images remain coincident.

Figure 12:
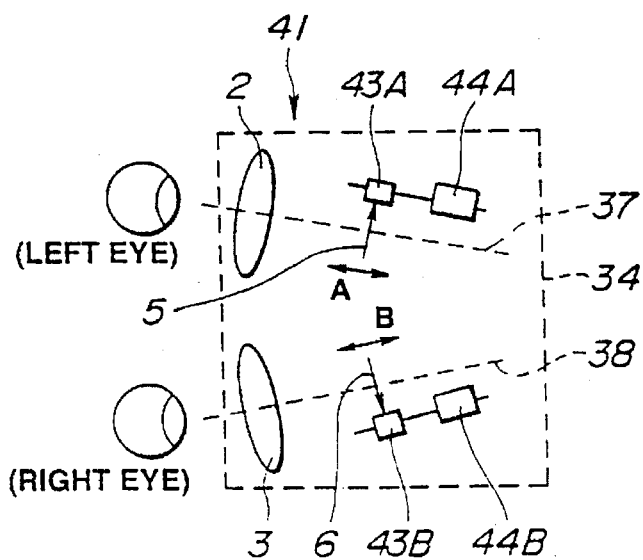
FIG. 12 is a schematic view of an adjusting mechanism which can be employed in the second embodiment.

FIG. 12 schematically shows an adjusting mechanism 41 which can be employed in the example shown in FIG. 6. The adjusting mechanism 41 serves as a first adjusting means for varying the left and right object picture distances.

In this example shown in FIG. 12, the left and right lenses 2 and 3 are stationary in a casing 34, and arranged symmetrically so that one is a mirror image of the other, and the optical axes 37 and 38 intersect each other at a predetermined distance. The adjusting mechanism 41 is arranged to vary the left object picture distance of the left screen from the left lens 2 and the right object picture distance of the right screen from the right lens 3 so that the left and right object picture distances remain equal to each other, by moving the left display panel 5 axially along the left optical axis 37 and the right display panel 6 along the right optical axis 38. The adjusting mechanism 41 of this example comprises left and right drive mechanisms each comprising a ball screw member 43A or 43B and a motor 44A or 44B for rotating the ball screw member. In this example, each motor 44A or 44B is a stepping (or stepper) motor. However, it is optional to employ, as each motor, a pulse motor instead of the stepping motor. The motors 44A and 44B are controlled by a motor control circuit so that the left and right object picture distances are held equal to each other.

Figure 13:
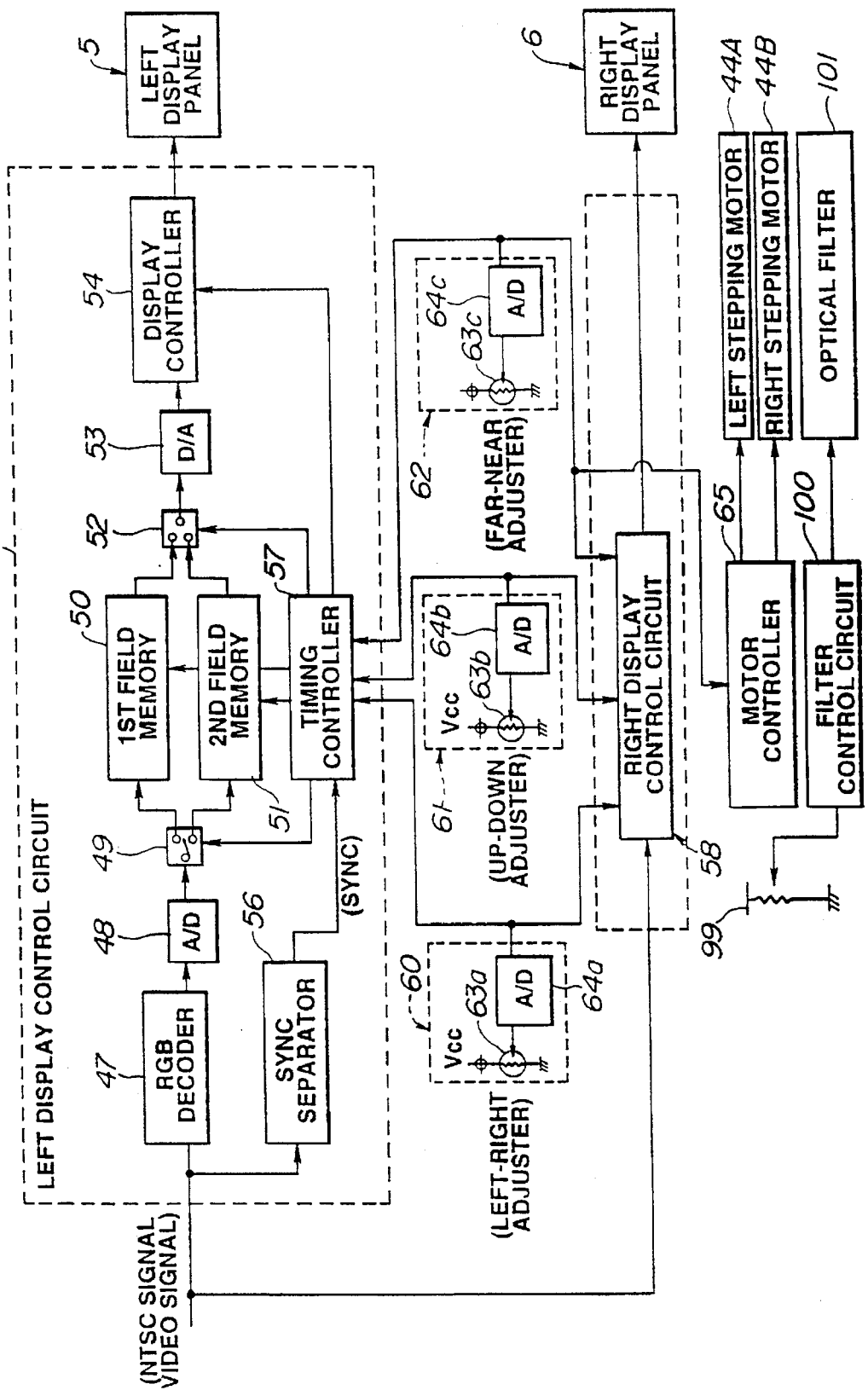
FIG. 13 is a block diagram showing an electric circuit which can be employed in the second embodiment.

FIG. 13 shows a control circuit which can be used in the second embodiment.

A control circuit shown in FIG. 13 comprises left and right display control circuits 46 and 58, a left and right adjuster circuit 60, an up and down adjuster circuit 61 and a far and near adjuster circuit 62, and a motor controller 65.

The left display control circuit 46 comprises a RGB decoder 47, an A/D converter 48, an input selector 49, first and second field memories 50 and 51, an output selector 52, a D/A converter 53, and a display controller 54. There are further provided a sync separator 56 and a timing controller 57.

The RGB decoder 47 is designed to extract RGB signals from the NTSC signal or a video signal of some other type. The input side of the RGB decoder 47 is connected with a signal input terminal, and the output side is connected to the input side of the A/D converter 48.

The input selector 49 has an input terminal connected with the output side of the A/D converter 48, a first output terminal connected with the input side of the first field member 50 and a second output terminal connected with the input side of the second field memory 51. The input selector 49 is switched by a control signal of the timing controller 57.

Each of the first and second field memories 50 and 51 is a memory which has a capacity for storing a digitized chrominance signal of one frame, and which is controlled by the timing controller 57.

The output selector 52 has a first input terminal connected with the output side of the first field memory 50, a second input terminal connected with the output side of the second field memory 51, and an output terminal connected with the input side of the D/A converter 53. The output selector 52 is also controlled by the timing controller 57.

The D/A converter 53 converts the digital RGB signals to analog signals. The output side of the D/A converter 53 is connected to the display controller 54.

The display controller 54 delivers picture signals to the left display panel 5 which, in this example, is a liquid crystal display panel. The display controller 54 is controlled by the timing controller 57. The output side of the display controller 54 is connected with the left display panel 5.

The received NTSC signal or other video signal is sent also to the sync separator 56, which removes the sync signal from the received signal. The input side of the sync separator 56 is connected with the video input terminal for receiving the NTSC or video signal, and the output side is connected to the input side of the timing controller 57.

In accordance with the sync signal supplied from the sync separator 56, the timing controller 57 controls the input and output selectors 49 and 52, the first and second field memories 50 and 51 and the display controller 54.

The right display control circuit 58 is substantially identical to the left display control circuit 46. The right display control circuit 58 is connected with the right display panel 6, and arranged to display pictures on the right display panel 6.

Each of the left and right adjusting circuit 60, the up and down adjusting circuit 61 and the far and near adjusting circuit 62 comprises a manual volume control member (or knob) 63a, 63b or 63c, and an A/D converter 64a, 64b or 64c. The output side of the A/D converter 64a, 64b or 64c of each adjusting circuit is connected with the timing controller 57 of each of the left and right display control circuits 46 and 58.

In accordance with a displacement (such as an angular displacement) of each of the left and right control knob 63a, the up and down control knob 63b and the far and near control knob 63c, the timing controllers 57 of the left and right display control circuits 46 and 58 perform a picture shift control to shift the left and right virtual images, left and right, up and down or back and forth (or far and near), while the left and right virtual images are held coincident.

The stepping motor controller 65 shown in FIG. 13 is connected with the left and right stepping motors 44A and 44B shown in FIG. 12, and designed to move the left and right display panels 5 and 6 axially along the respective optical axes 37 and 38 by controlling the motors 44A and 44B.

The thus-constructed control circuit 45 can move the left and right virtual images in the left and right direction, the up and down direction and the far and near direction while the centers of the left and right images are held substantially coincident.

The control circuit shown in FIG. 13 further includes a brightness control volume member 99 and a filter control circuit 100 for controlling the transmittance of an optical filter 101 corresponding to the filter 10 shown in FIGS. 2 and 5, in accordance with a signal from the brightness control section 99.

Figure 14:
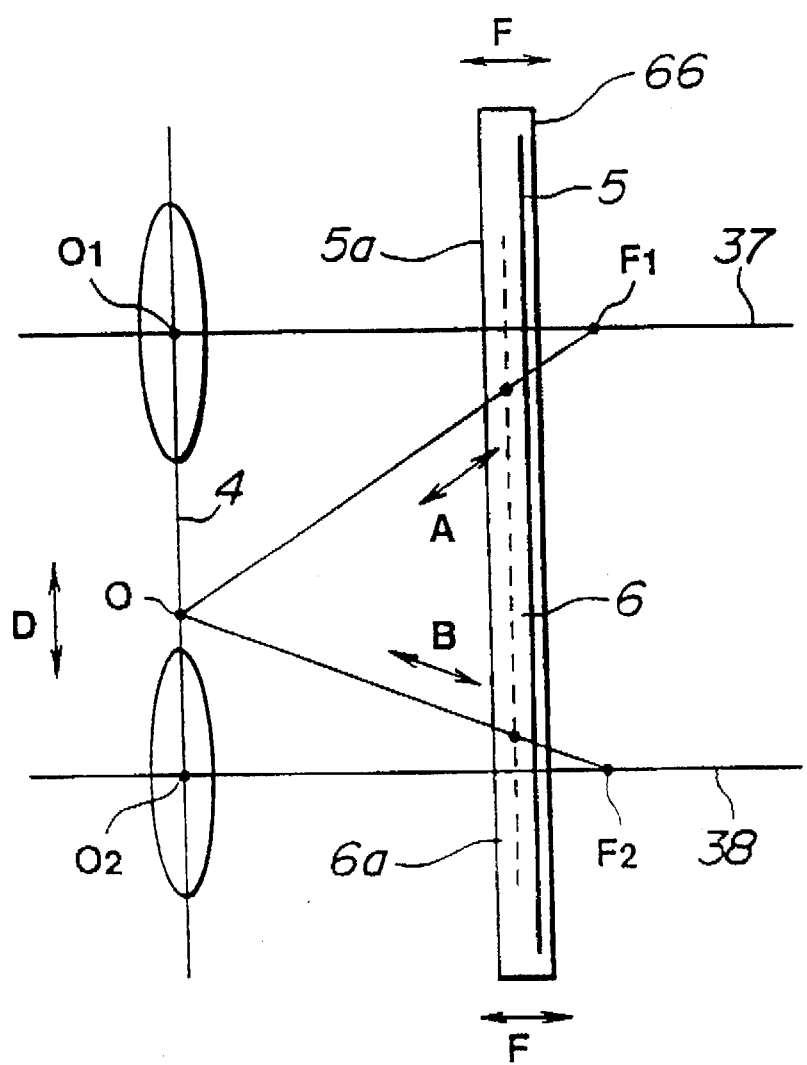
FIG. 14 is a schematic plan view showing an arrangement according to a third embodiment of the present invention.
Figure 15:
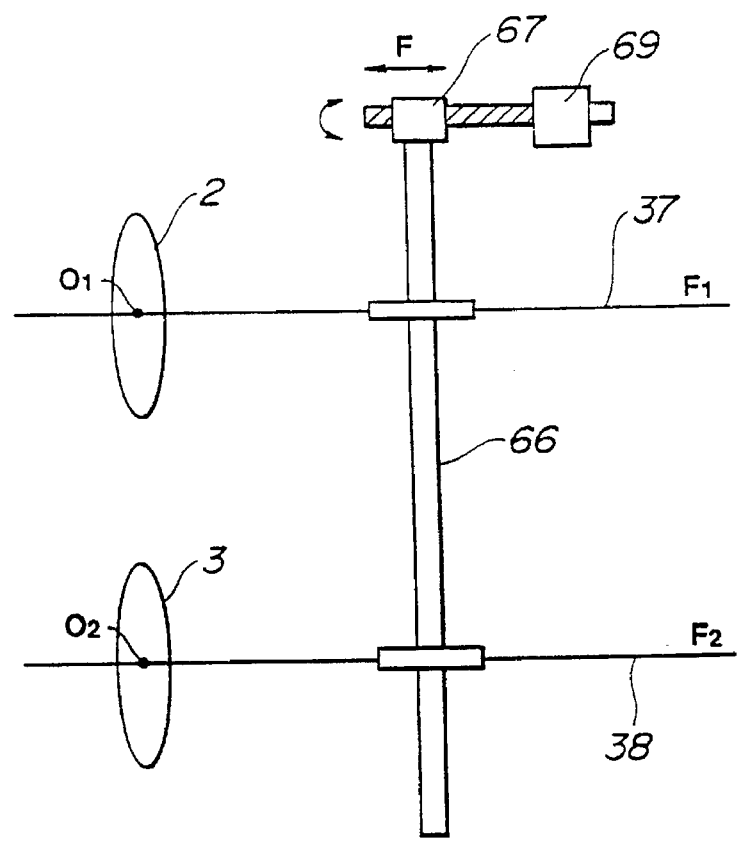
FIG. 15 is a schematic plan view showing an adjusting mechanism which can be employed in the third embodiment.
Figure 16:
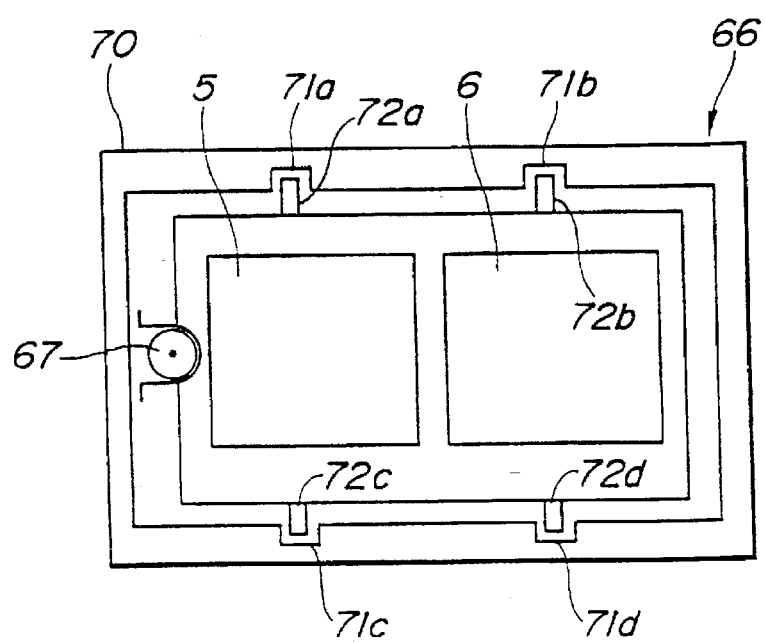
FIG. 16 is a schematic sectional view showing the adjusting mechanism shown in FIG. 15.

FIGS. 14, 15 and 16 shows a display system according to a third embodiment of the present invention. In the example shown in FIG. 14, the left and right optical axes 37 and 38 of the left and right lenses 2 and 3 are parallel to each other as in the example shown in FIG. 1. A display carrier (or display panel holder) 66 carries a display panel which, in the example shown in FIGS. 14~16, consists of left and right display panels 5 and 6 as in the preceding examples. In the third embodiment, the separation between the left and right display panels 5 and 6 remain constant, and instead the separation between the left picture frame 5a and the right picture frame 6a is varied as in the second embodiment. The display system of the example shown in FIGS. 14~16 is arranged to move the centers of the left and right picture frames 5a and 6a, respectively, on the normally oblique left straight line segment OF1 extending from the common point O to the focal point F1 of the left lens 2 and the normally oblique right straight line segment OF2 between the common point O and the focal point F2 of the right lens 3 while the left and right display panels 5 and 6 are moved axially by the display carrier 66 along the left and right optical axes 37 and 38. In this way, this display system can move the position of the virtual images in the same manner as in the first embodiment shown in FIG. 1.

An adjusting mechanism shown in FIG. 15 comprises a ball screw member attached to one side of the display carrier 66, a rotary screw rod 68 engaging with the ball screw member 67, and a stepping motor 69 for rotating the rod 68. By controlling the motor 69, it is possible to move the display panel holder 66along the left and right optical axes 37 and 38, as shown by F in FIGS. 14 and 15.

A casing 70 shown in FIG. 16 is formed with guide grooves 71a~71d extending along the parallel left and right optical axes 37 and 38. The display carrier 66 has slider projections 72a~72d which are slidably received in the guide grooves 71a–71d, respectively.

The control circuit shown in FIG. 13 can be used also in the display system shown in FIGS. 14–16. The electric control circuit moves the centers of the left and right picture frames 5a and 6a in accordance with the signals from the control volume knobs 63a, 63b and 63c, and thereby makes it possible to move the left and right virtual images along the left and right direction, the up and down direction and the far and near direction without increasing the minimized separation between the left and right virtual images.

FIGS. 17–21 show a display system of an example according to a fourth embodiment of the present invention. An optical block 73 of this example is arranged to vary the left and right separation between the left and right lenses 2 and 3. In this example, the left and right optical axes 37 and 38 of the left and right lenses 2 and 3 are held parallel to each other, and the left and right lenses 2 and 3 comprises principal planes which are coplanar and lie in the same common principal plane 4. In this example, the left and right display panels 5 and 6 of this example are parallel to the common principal plane 4, and held immovable.

Figure 17:
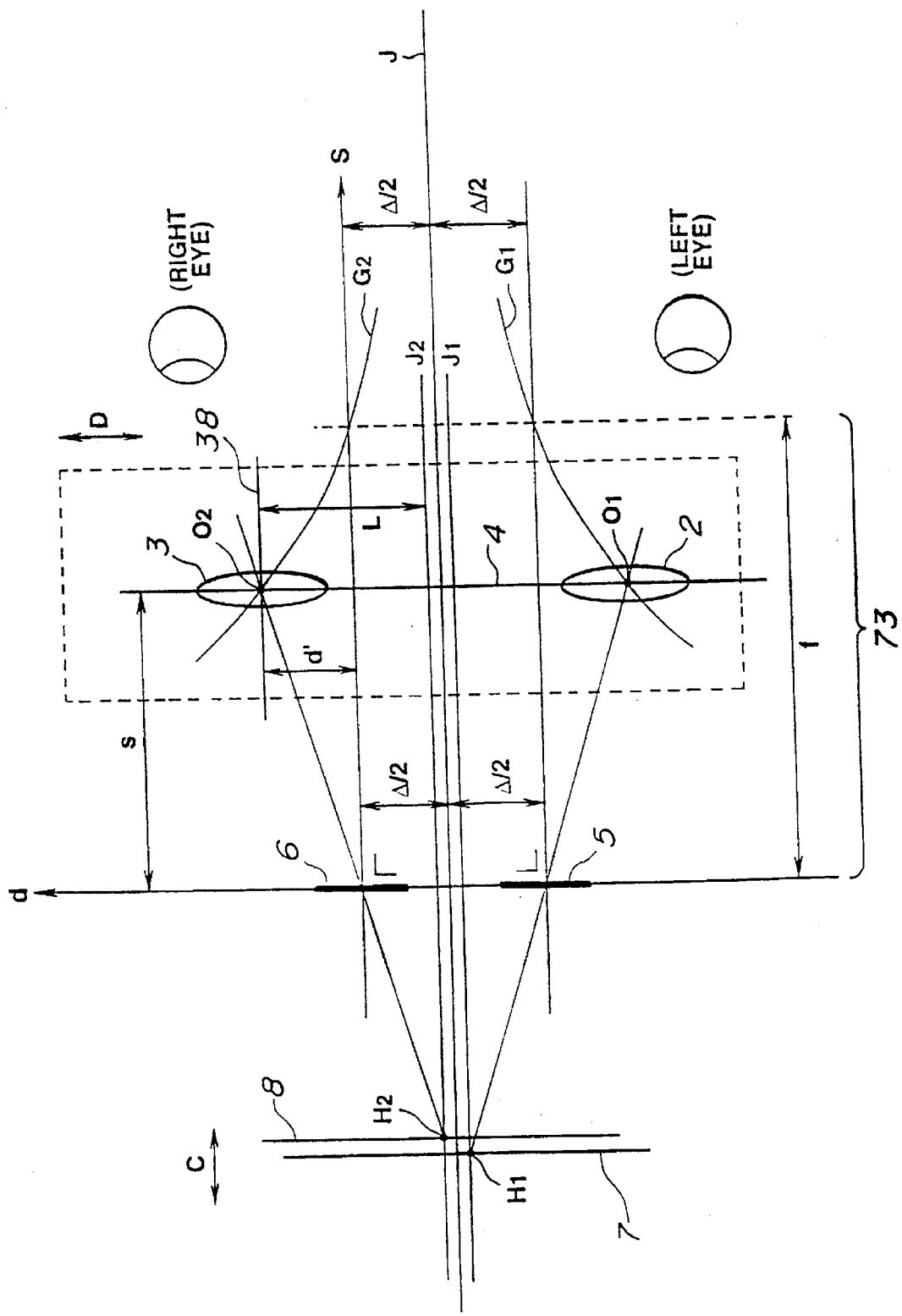
FIG. 17 is a schematic horizontal sectional view showing a basic arrangement according to a fourth embodiment of the present invention.

In this example, the left and right lenses 2 and 3 are bilateral-symmetrically arranged with respect to a median plane which appears as a reference center line J in FIG. 17. The left and right lenses 2 and 3 are moved, respectively, along left and right curved lines G1 and G2 which are symmetrical with respect to the center line J. The curved lines G1 and G2 are so shaped that the left and right lens separation decreases as the lens-object distance s increases. The left and right object picture separation between the left and right display panels 5 and 6 is constant in this example. Therefore, the ratio (or separation ratio) of the left and right object picture separation to the left and right lens separation is increased as the object distance increases.

The principal point O2 of the right lens 3 is moved on the right curved line G2. A distance d shown in FIG. 17 is a distance between the principal point O2 and the center line which passes through the center of the right picture and extends in parallel to the center line J. This distance d of the principal point O2 on the curved line G2 from the center line of the picture is given by;

$$d = \Delta \cdot f/(2s) \quad (6)$$

Thus, the principal points O1 and O2 are moved, respectively, on the curved lines G1 and G2 as the common principal plane 4 is moved along the center line J. With this arrangement, this system can move the left and right virtual images in the far and near direction C perpendicular to the principal plane 4 while the left and right virtual images are held coincident.

This system further makes it possible to move the coincident left and right virtual images left and right by moving the optical system shown by a rectangle of one dot chain line shown in FIG. 17 along the left and right direction D shown in FIG. 17 while maintaining the relationship within the one dot chain rectangle. Similarly, it is possible to move the coincident left and right virtual images up and down by moving the left and right lenses 2 and 3 in the up and down direction while the relationship in the one dot chain line rectangle is maintained.

In this arrangement shown in FIG. 17, the left and right object picture distances s of the left and right pictures from the common principal plane 4 are equal to each other. Therefore, the left and right virtual images are formed in the same image plane.

As to the right side of the system shown in FIG. 17, the lateral magnification m of the right lens 3 is given by;

$$m = f/(f-s) \quad (7)$$

From the equation (7), the distance L between the right optical axis 38 and an image center line J1 which extends in parallel to the center line J and passing through the center H2 of the right virtual image is:

$$\begin{aligned} L &= m \cdot d' = d' \cdot f/(f-s) \\ &= d' + d' \cdot s/(f-s) \end{aligned} \quad (8)$$

Substitution of the equation (6) into the equation (8) gives:

$$\begin{aligned} L &= (\Delta \cdot f/(2s') - \Delta/2) \\ &= d' + \Delta/2 \end{aligned} \quad (9)$$

Therefore, the right image center line J1 is coincide and collinear with the reference center line J. Similarly, the left image center line J2 is coincide with the reference center line J. Thus, the left and right images are centered at the same position on the reference center line J.

Figure 18:
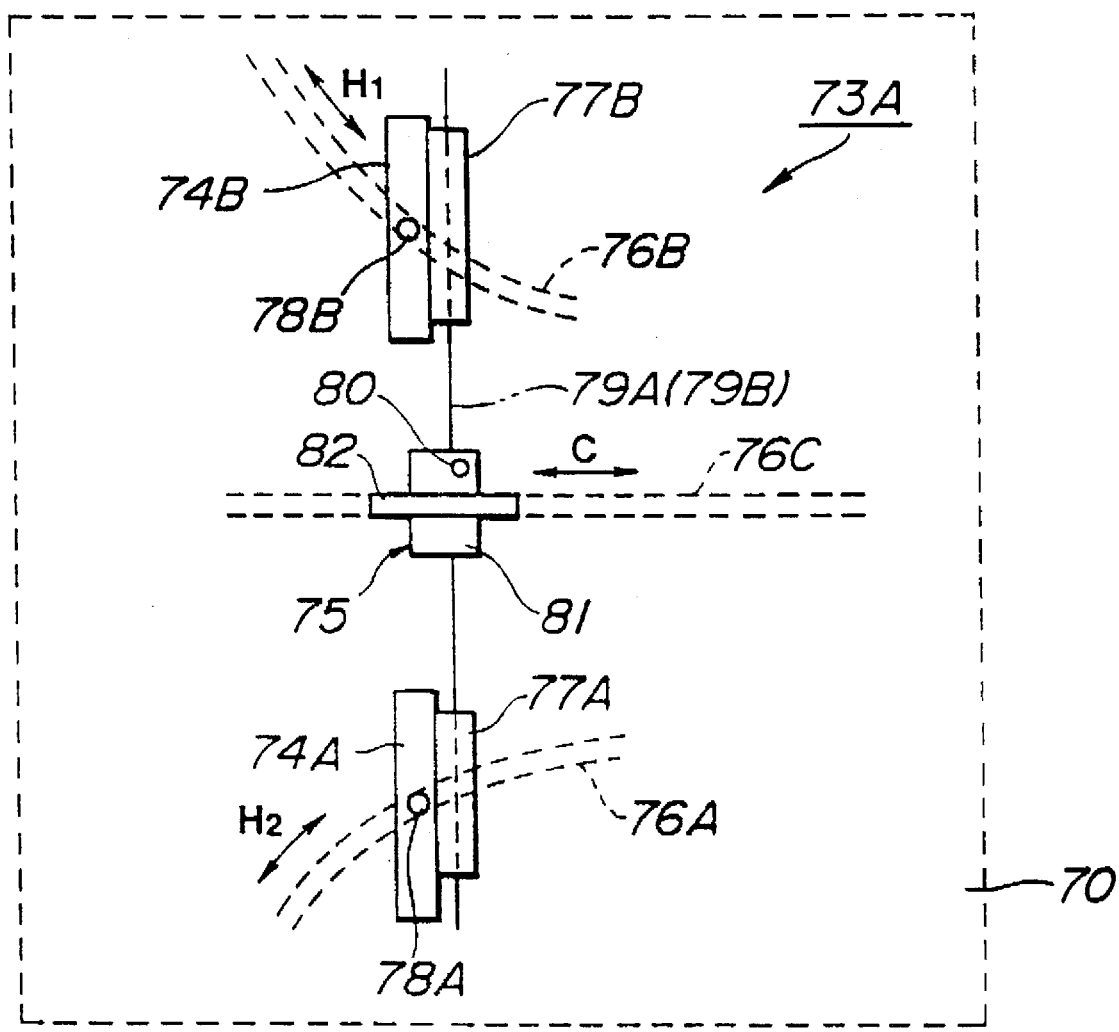
FIG. 18 is a schematic plan view showing an adjusting mechanism which can be employed in the fourth embodiment.
Figure 19:
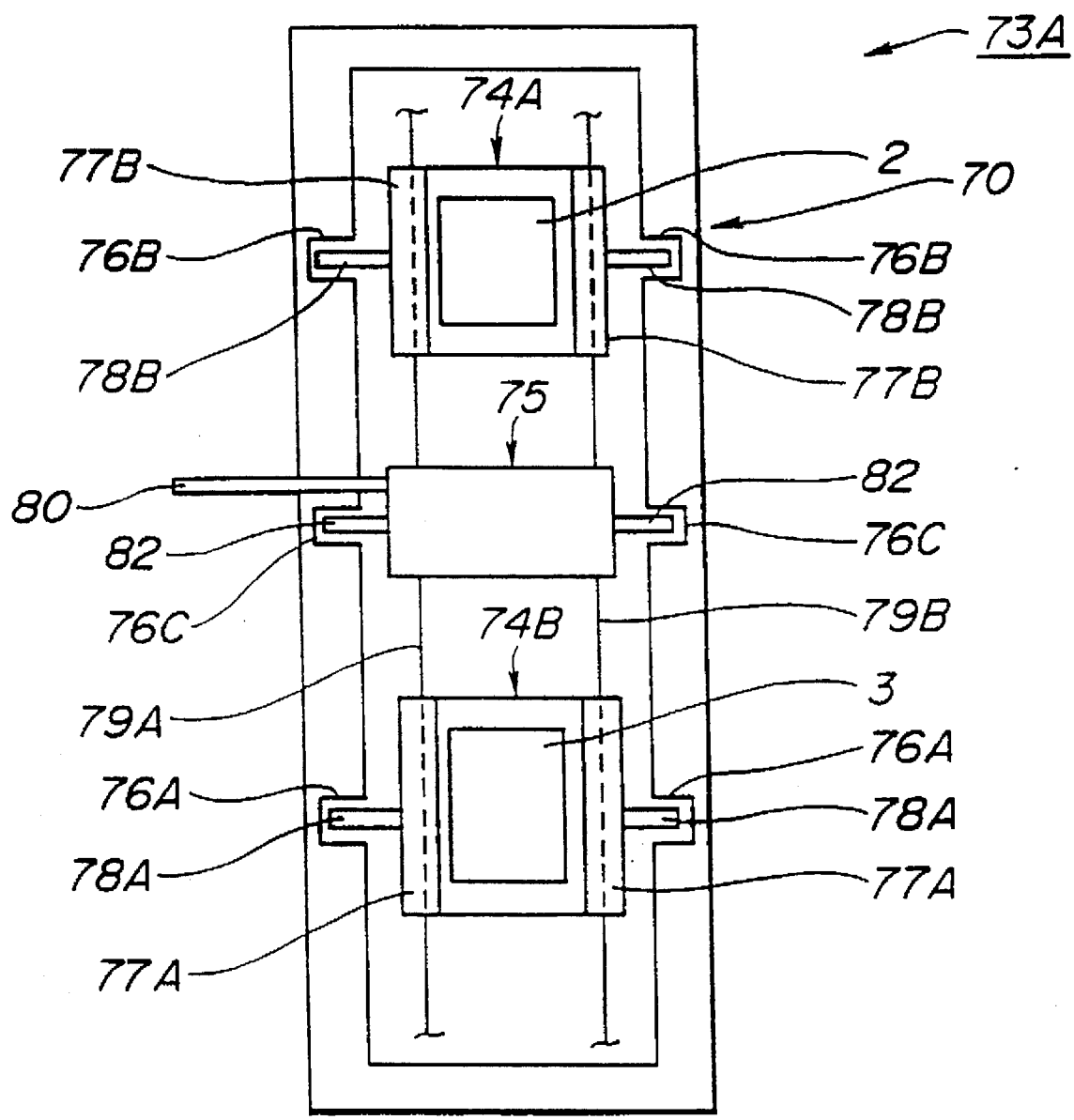
FIG. 19 is a sectional view showing the adjusting mechanism shown in FIG. 18.

The display system of this example comprises a lens adjusting mechanism 73A shown in FIGS. 18 and 19. This mechanism 73A comprises a left lens holder 74A carrying the left lens 2, a right lens holder 74B carrying the right lens 3, and a middle member 75 which, in this example, is a metal member. A case 70 is formed with a pair of left curved guide grooves 76B; a pair of right curved guide grooves 76A, and a pair of straight guide grooves 76C. The straight guide grooves 76C extend along the reference center line J. The left curved guide grooves 76B extend along the curved line G1, and similarly, the right curved guide grooves 76A extend so as to describe the curved line G2.

Each lens holder 74A or 74B has first and second portions 77A or 77B through which first and second guide piano wires 79A and 79B pass as shown in FIG. 19. Each of the lens holders 74A and 74B is slidable on the guide wires 79A and 79B along the left and right direction. Each lens holder 74A or 74B further comprises slider projections 78A or 78B which are slidably received in the curved guide grooves 76A or 76B. The left and right lens holders 74A and 74B are movable, respectively, in the directions H1 and H2 along the curved lines G1 and G2, respectively.

The middle member 75 has a knob 80 in the form of a projecting rod, a slide member 81 holding the guide wires 79A and 79B, and slider projections 82 slidably received in the straight guide grooves 76C. The middle member 75 is movable in the direction C shown in FIG. 18 in parallel to the reference center line J.

This mechanism 73A is assembled by placing the sliders 82 of the middle member 75 in the straight guide grooves 76C, and the sliders 78A and 78B of the left and right holders 74A and 74B in the curved guide grooves 76A and 76B, and connecting these members by the guide wires 79A and 79B.

A movement of the knob 80 causes a movement of the middle member 75 along the straight guide grooves 76C. This rectilinear movement of the middle member 75 causes the left and right lens holders 74B and 74A connected with the middle member 75 by the guide wires 79A and 79B, to move along the respective curved line G1 and G2, guided by the curved guide grooves 76A and 76B.

The straight guide grooves 7C and the middle member 75 serves as a first adjusting means for producing a rectilinear motion to varying the object distance, and the curved guide grooves 76A and 76B and the sliders 78A and 78B serves as a second adjusting means for varying the left and right lens separation in dependence on the object distance.

Figure 20:
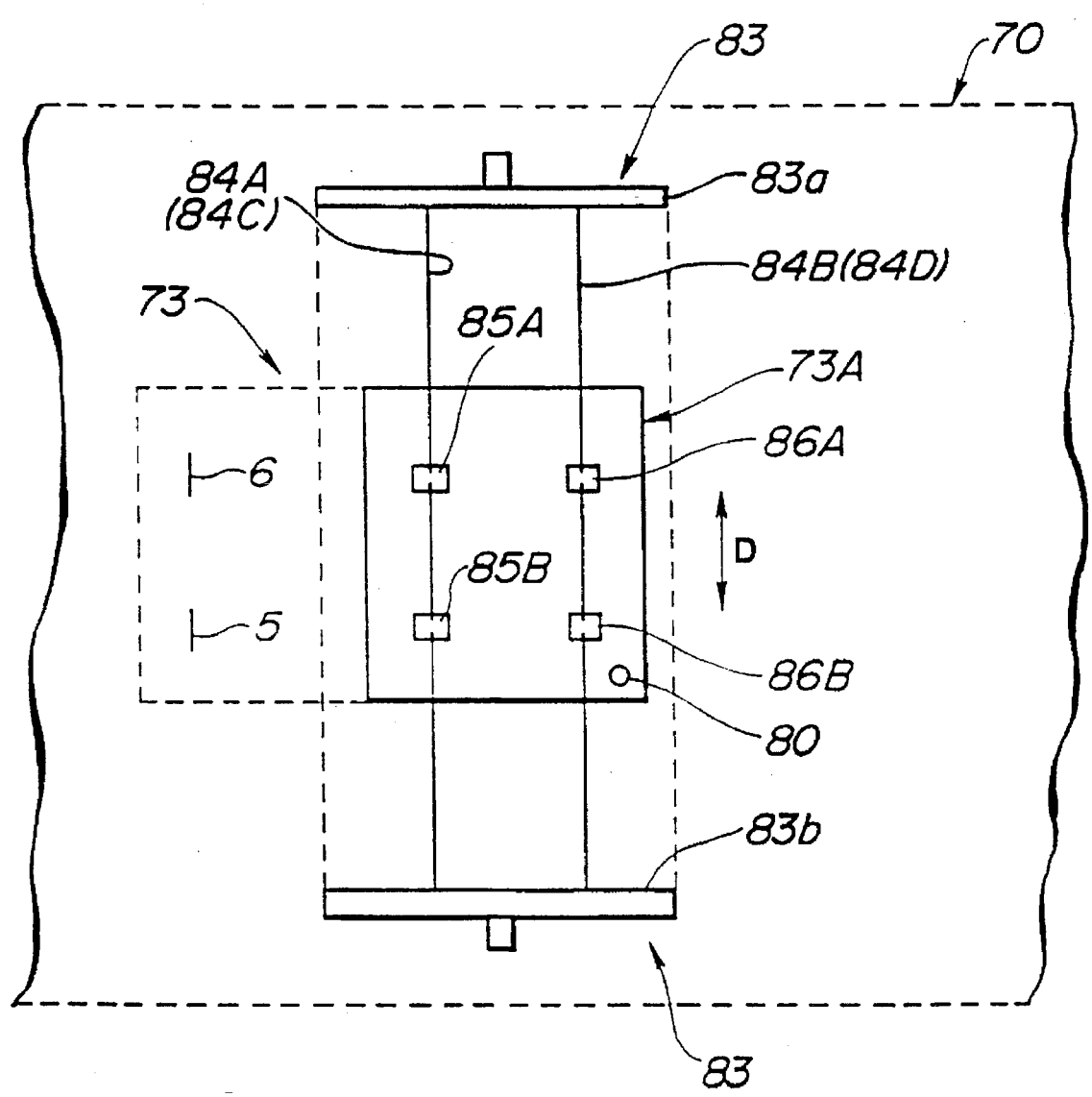
FIG. 20 is a schematic plan view showing a guide mechanism for guiding the adjusting mechanism 73A shown in FIG. 19 in the left and right direction.
Figure 21:
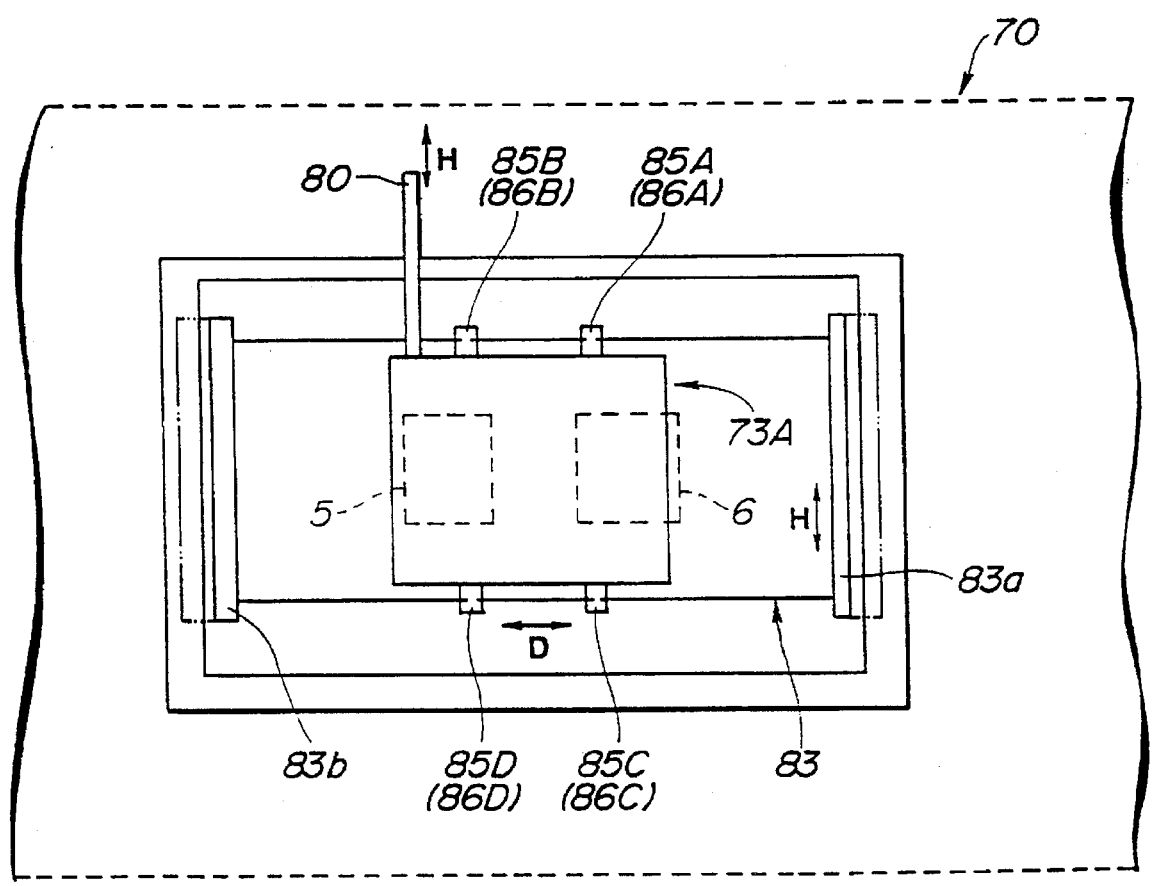
FIG. 21 is a schematic elevation showing the guide mechanism of FIG. 20.

This display system further comprises a guide mechanism 83 as shown in FIGS. 20 and 21. The guide mechanism 83 has left and right guide support, members 83b and 83a which are slidably supported by a frame stationary to the casing 70. Between the left and right guide support members 83b and 83a, upper and lower guide piano wires 84A and 84C and upper and lower guide piano wires 84B and 84D are stretched along the left and right direction. The lens adjusting mechanism has slide portions 85A, 85B, 86A, 86B, 85C, 86C, 85D and 86D slidably receiving the guide wires 84A, 84B, 84C and 84D. Thus, the lens adjusting mechanism 73A is mounted on the guide wires 84A–84D and movable on these guide wires along the left and right direction D shown in FIG. 20. In this way, by gripping the knob 80, it is possible to move the lens adjusting mechanism 73A, relative to the left and right display panels 5 and 6, along the left and right direction D. In this case, the display panels 5 and 6 are fixed immovable.

By moving the knob 80 up and down, it is further possible to move the guide support 83 with the lens adjusting mechanism 73A along the up and down direction H shown in FIG. 21. In this way, the lens adjusting mechanism 73A can be moved up and down, relative to the display panels 5 and 6 which are held stationary relative to the case 70.

Thus, the display system of this example makes it possible to move the common axial plane up and down relative to the display section, and the optical median plane between the left and right lenses 2 and 3 left and right relative to the display section.

Figure 22:
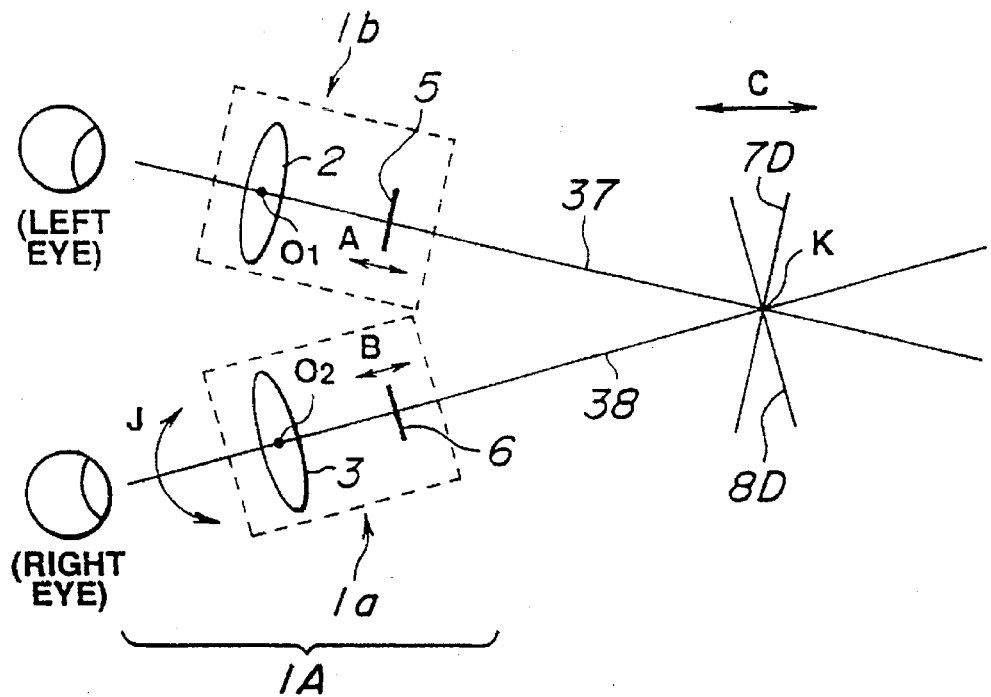
FIG. 22 is a schematic plan view showing a basic arrangement according to a fifth embodiment of the present invention.
Figure 23:
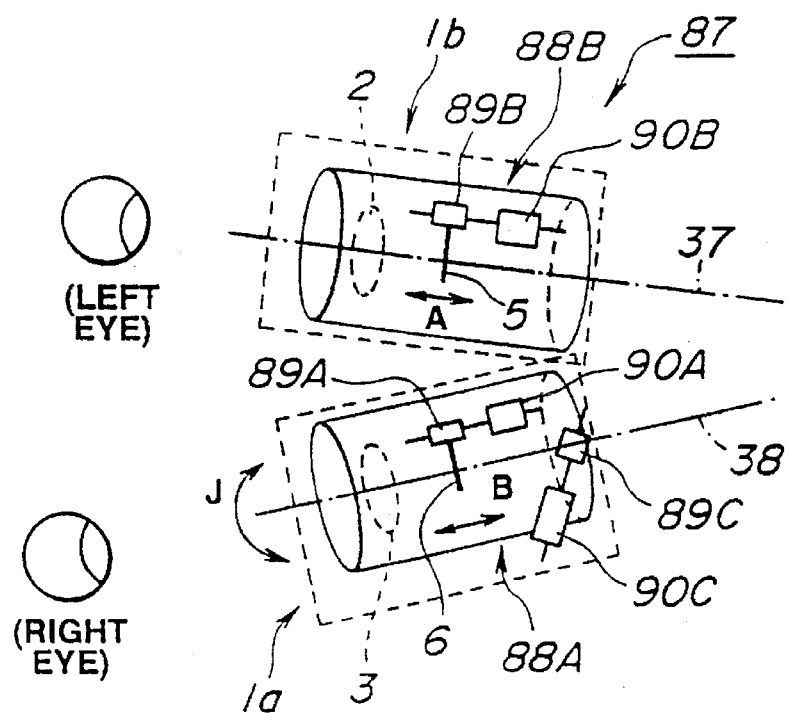
FIG. 23 is a schematic view of an adjusting mechanism which can be employed in the fifth embodiment.
Figure 24:
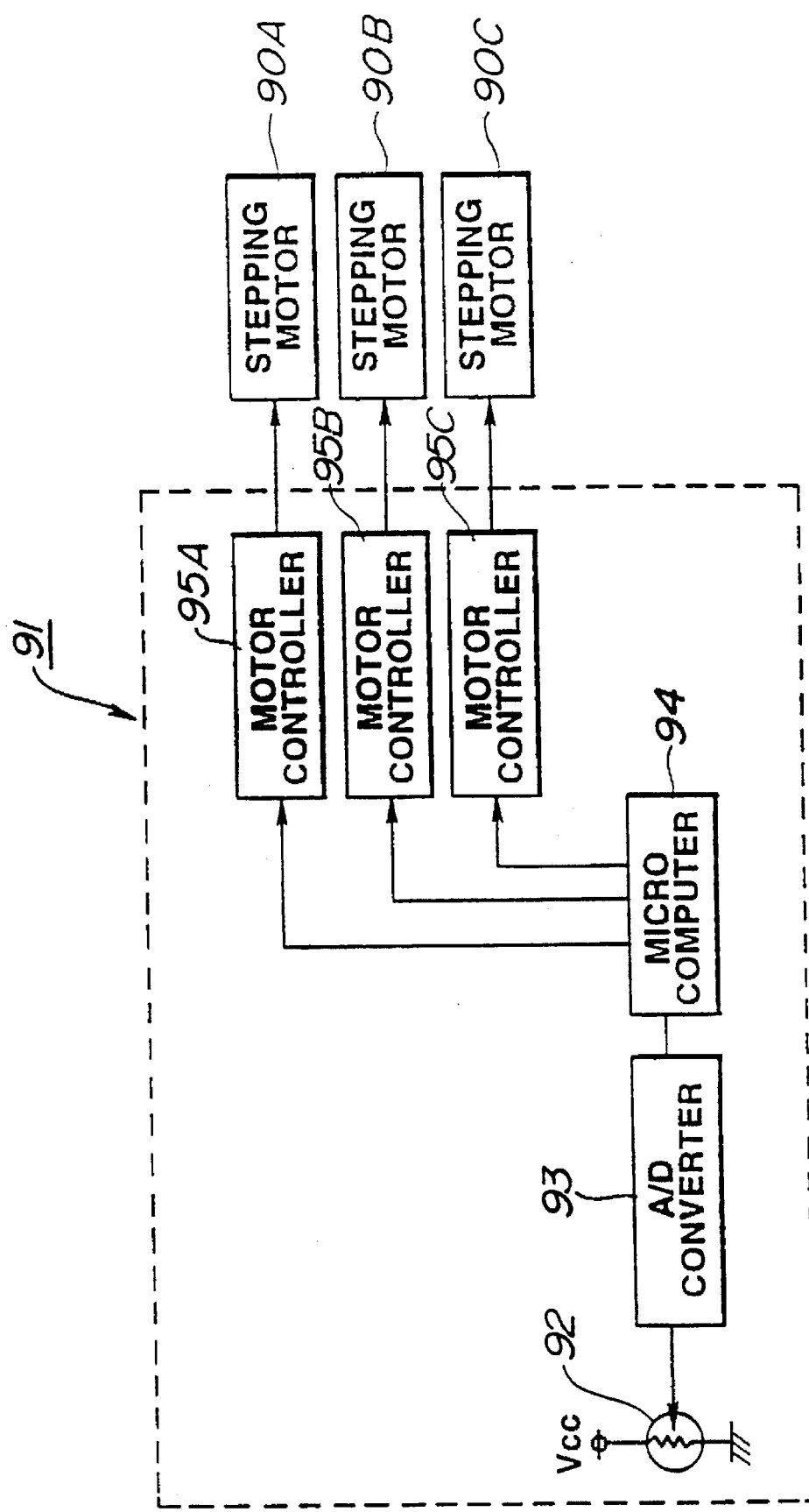
FIG. 24 is a block diagram showing an electric circuit for controlling the adjusting mechanism of FIG. 23.

FIGS. 22, 23 and 24 show a display system according to a fifth embodiment of the present invention. An optical block 1A of this example is arranged to shift the intersection point K of the left and right optical axes 37 and 38 along the far and near direction.

The optical block 1A of this example consists of a left section 1b including the left lens 2 and the left display panel 5, and a right section 1a including the right lens 3 and the right display panel 5. In each of the left and right sections 1b and 1a, the display panel is perpendicular to the optical axis and axially movable along the optical axis, as shown by arrows A and B in FIG. 22.

Moreover, at least one of the left and right optical sections 1b and 1a is rotatable in such a rotational direction as to shift the intersection point K along the far and near direction C. In this example, the right section 1a is rotatable around the principal point O2 of the right lens 3 in a rotational direction J shown in FIG. 22.

FIG. 23 shows an adjusting mechanism 87 of this example. The left and right optical sections 1b and 1a are installed, respectively, in left and right barrels 88B and 88A having the shape of a hollow circular cylinder.

In each of the left and right barrels 88B and 88A of this example, the center line (axis) of the cylindrical barrels passes through the principal point of the lens and the screen center of the display panel. The center line of the left barrel 88B is coincident with the left optical axis 37, and the center line of the right barrel 88A is coincident with the right optical axis 38. In each of the left and right barrels 88B and 88A, there are further provided a stepping motor 90B or 90A, and a ball screw member 89B or 89A driven by the stepping motor. The stepping motor 90B and the ball screw member 89B serve as an adjusting means for moving the left display panel 5 in the direction A along the left optical axis 37. The right display panel 6 is axially moved likewise by the stepping motor 90A and the ball screw member 89A along the right optical axis 38.

There is further provided an adjusting setup of a stepping motor 90C and a ball screw member 89B for rotating the whole of the right barrel 88A in the rotational direction J shown in FIG. 23, to shift the axial intersection point K along the far and near direction. The motor 90C drives the screw member 89C, which in turn causes the right barrel 88A to rotate on a swing axis. In this example, this swing axis passes through the principal point O2 of the right lens 3, and is perpendicular to the common axial plane containing both of the left and right optical axes 37 and 38. By moving the intersection point K along the far and near direction in this way, it is possible to change the positions of the left and right images.

Simultaneously with this movement of the intersection point K in the far and near direction due to the rotation of the right barrel 88A in the J direction, the display system of this example axially moves the left and right display panels 5 and 6, relative to the lenses 2 and 3, along the respective optical axes 37 and 38 by controlling the stepping motors 90B and 90A. By so doing, this system can shift the left and right virtual images while holding both virtual images coincident.

FIG. 24 shows an electric control circuit 91 of this example. The control circuit 91 has a manually rotatable volume control member 92, an analog-to-digital converter 93, a microcomputer 94, and motor controllers 95A, 95B and 95C. The output side of the volume member 92 is connected to the analog-to-digital converter 93, whose output side is connected to the microcomputer 94. In accordance with the signal sent from the volume member 92 through the converter 93, the microcomputer 94 generates motor control signals and sends these motor control signals to the motor controller 95A, 95B and 95C, respectively. By controlling the stepping motors 90A, 90B and 90C, this control circuit 91 can move the left and right virtual images so that both images remain coincident.

Figure 25:
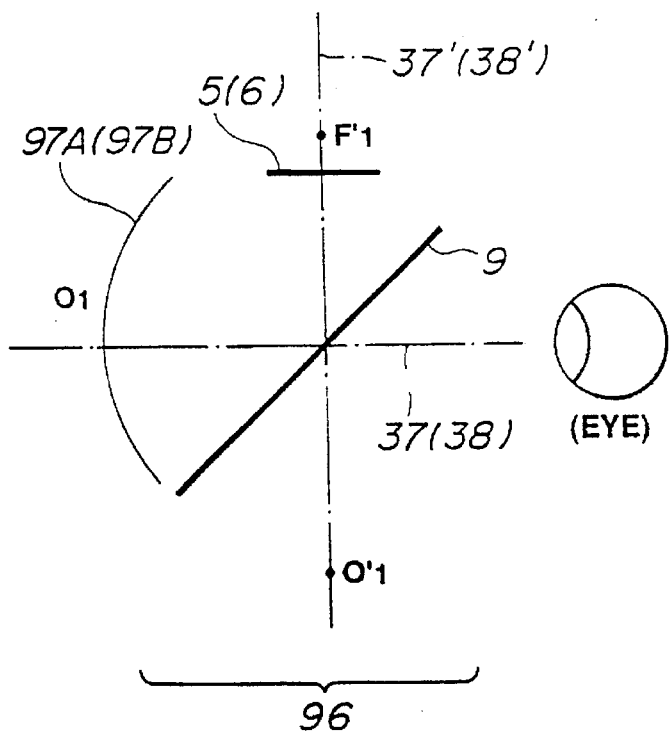
FIG. 25 is a schematic side elevation view showing a basic arrangement according to a sixth embodiment of the present invention.
Figure 26:
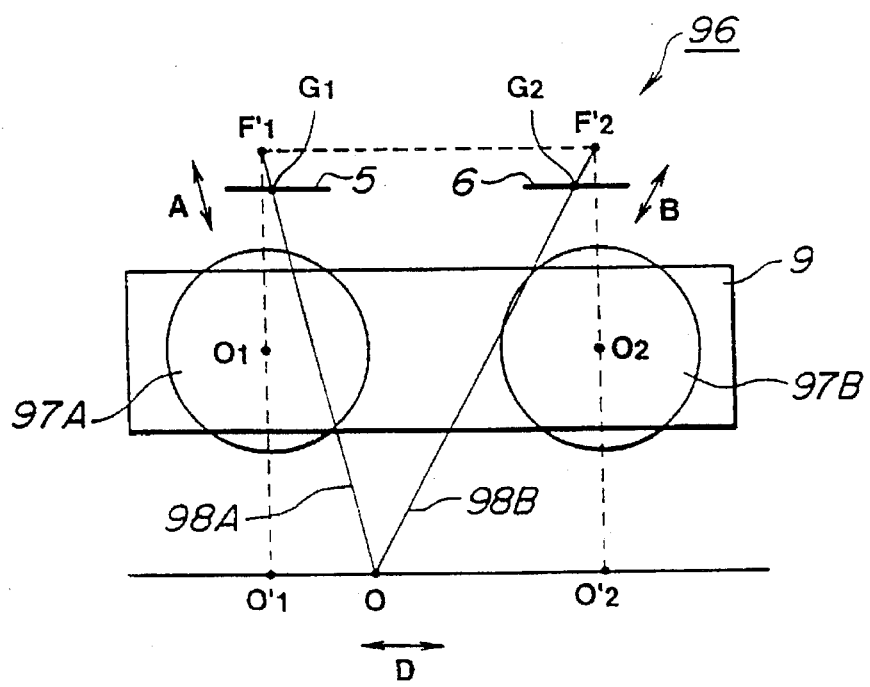
FIG. 26 is a front elevation view of the arrangement of FIG. 25, as viewed from the direction of the eyes.
Figure 27:
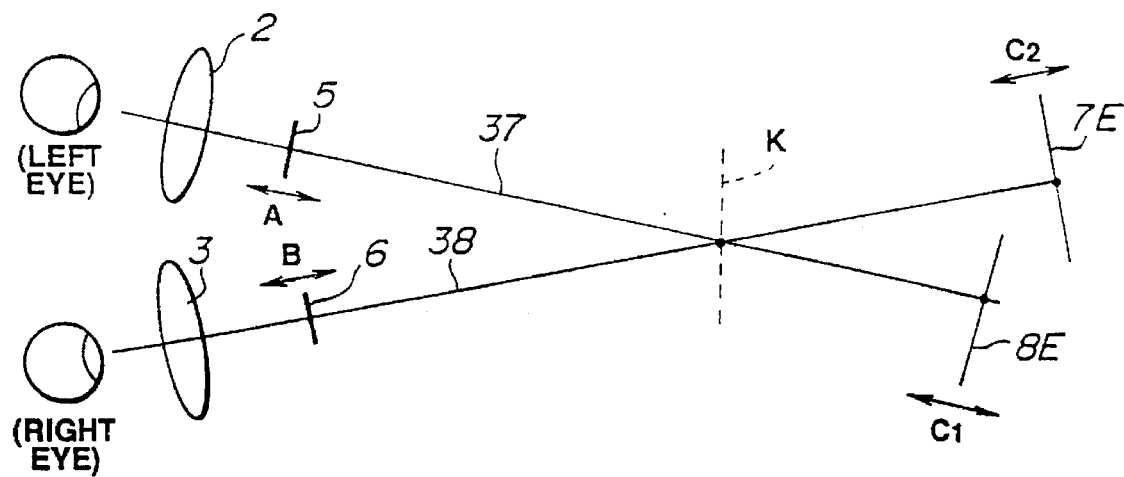
FIG. 27 shows an optical system in one example of related art.
Figure 28:
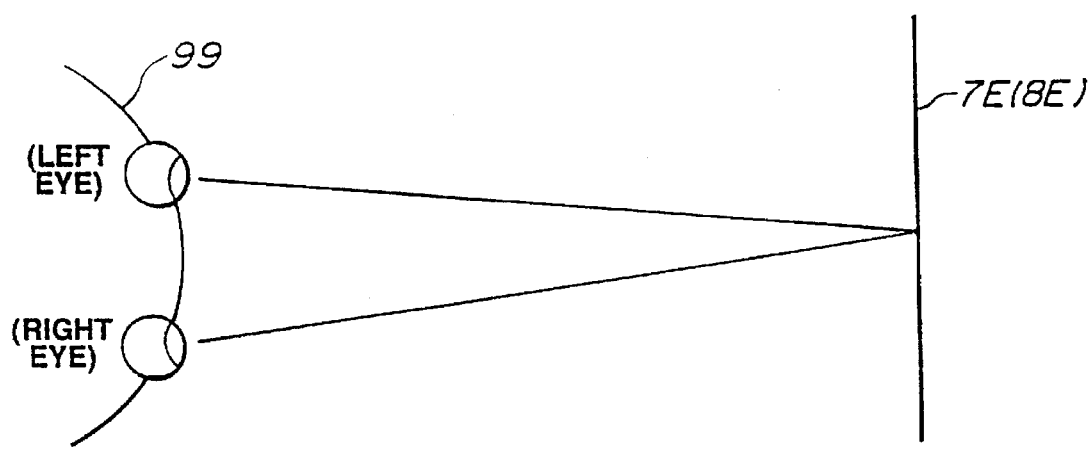
FIG. 28 is a view showing a relationship of both eyes and fixed images in one example of the related art.
Figure 29:
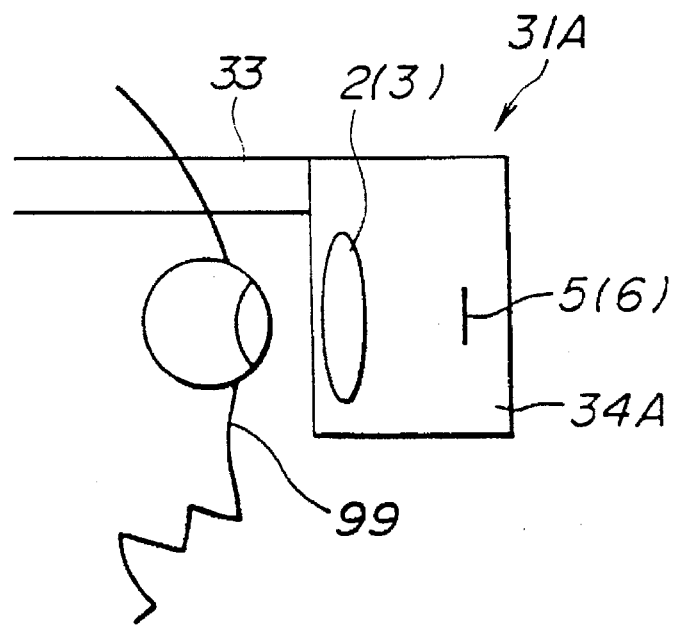
FIG. 29 is a view showing display device in one example of the related art, worn on a head.
Figure 30:
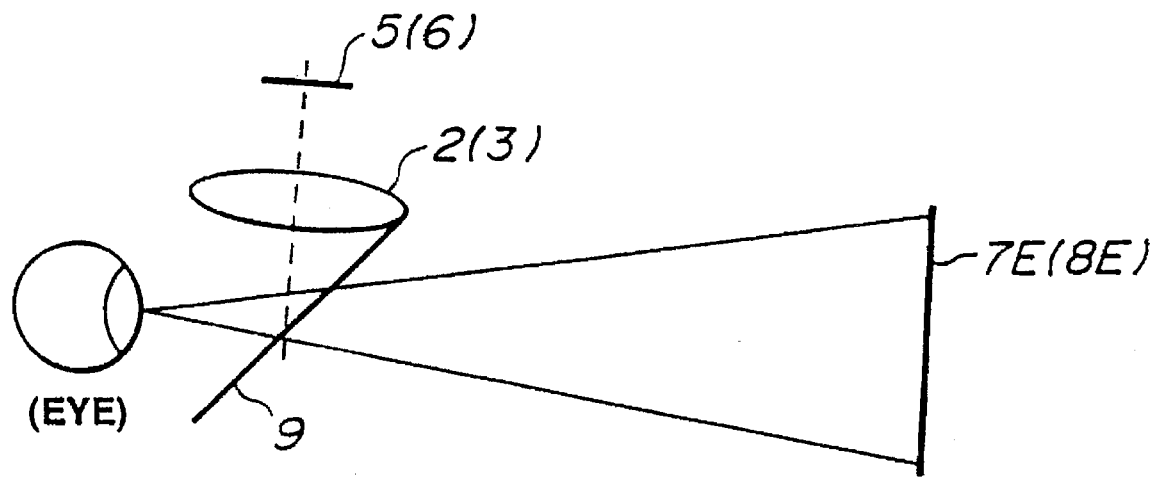
FIG. 30 shows an optical system including a half mirror in one example of the related art.

FIGS. 25 and 26 show a display system according to a sixth embodiment. The display system according to the sixth embodiment employs left and right concave mirrors 97A and 97B instead of the left and right lenses.

In an optical block 96 of the example shown in FIG. 25, the left and right concave mirrors 97A and 97B are placed so as to confront the left and right eyes, respectively, and a half mirror 9 is placed between the position of the left and right eyes and the position of the left and right concave mirror 97A and 97B, as shown in FIG. 25. The half mirror 9 is a plane mirror. In the example shown in FIG. 25, the half mirror 9 is inclined at 45° with respect to the common axial plane containing both of the left optical axis 37 of the left concave mirror 97A and the right optical axis 38 of the right concave mirror 97B. In FIG. 25, straight lines 37' and 38' are reflected optical axes which are mirror images of the left and right optical axes 37 and 38 with respect to the mirror surface of the half mirror 9. Similarly, the half mirror 9 determines an image O'1 of the primary point O1 of the left concave mirror 97A, and an image O'2 of the primary point O2 of the right concave mirror 97B. In this example, the original optical axes 37 and 38 are parallel to each other in a horizontal common axial plane, and the reflected optical axes 37' and 38' are parallel to each other in a vertical common axial plane which is perpendicular to the horizontal plane. In this example, the left display panel 5 is perpendicular to the reflected left optical axis 37' and the right display panel 6 is perpendicular to the reflected right optical axis 38'.

In this optical block 96, the half mirror 9 reflects the picture of each of the left and right display panels 5, and the concave mirrors 97A add 97B produces left and right magnified virtual images, which the viewer can view with both eyes through the half mirror 9.

In FIG. 26, a common point O lies on a straight line passing through both of the reflected principal points O'1 and O'2. In this example, the common point O is movable along this line. Points F'1 and F'2 are reflected focal points which lie, respectively, on the reflected optical axes 37' and 38'. In this example, the focal distance of the left concave mirror 97A is equal to that of the right concave mirror 97B. The principal points O1 and O2 lie on a common principal plane to which the left and right optical axes 37 and 38 are perpendicular. The reflected principal points O'1 and O'2 are in a reflected common principal plane, and the reflected focal points F'1 and F'2 are in a reflected common focal plane. The reflected common principal plane and the reflected common focal plane are parallel to each other and perpendicular to a reflected common axial plane containing the reflected optical axes 37' and 38', and the distance between the reflected common principal plane and the reflected common focal plane is equal to the focal distance of the left and right concave mirrors 97A and 97B.

In this example, the center of the left display panel 5 lies on a normally oblique straight line segment OF'1 connecting the common point O and the reflected focal point F'1, and moves along this line segment OF'1. Similarly, the center G2 of the right display panel 6 is movable on a normally oblique straight line segment extending from the common point O to the reflected focal point F'2. The screens of the left and right display panels 5 and 6 are held in a common object picture plane.

This system makes it possible to move the left and right images in the far and near direction toward and away from the viewer by moving the common object picture plane toward and away from the reflected common principal plane so that the centers G1 and G2 of the panels 5 and 6 move on the respective oblique line segments OF'1 and OF'2. With this movement, the left and right virtual images move toward and away from the viewer while the left and right virtual images are held coincident. Moreover, it is possible to move the coincident left and right virtual images left and right by moving the common point O along the line passing through the reflected principal points O'1 and O'2.

The display system of this example employs an adjusting mechanism comprising guide piano wires 98A and 98B. It is possible to construct this adjusting mechanism substantially in the same manner as the adjusting mechanism 11 shown in FIG. 3.

In the present invention, it is possible to replace the optical system of the left and right lenses 2 and 3 in each of the display systems shown in FIG. 6, FIG. 17 and FIG. 22, by the optical system of the left and right concave mirrors and the half mirror in the same manner as shown in FIGS. 25 and 26. In this case, the principal points of the left and right lenses are replaced by the reflected principal points O'1 and O'2 of the concave mirrors reflected by the half mirror, and the left and right optical axes of the left and right lenses are replaced by the reflected optical axes 37' and 38' as shown in FIGS. 25 and 26.

The display system according to the present invention may comprise, or may be adapted to be connected with, a VTR (or VCR), a computer capable of producing NTSC signals or other video or television signals, or some other image producing or reproducing equipment item. In the present invention, it is possible to present stereoscopic imagery with a three dimensional effect by employing two separate display control circuits for producing left and right pictures having the effect of binocular parallax, for example.

The arrangement according to the present invention is applicable to a display system in which the left and right virtual images are fixed immovable at the same predetermined position. In this case, the optical equipment items such as the left and right lenses or concave mirrors and the half mirror, and the left and right display panels are fixed at respective positions by fastening brackets in a casing.

According to the present invention, it is possible to form the left and right virtual images coincidentally at any one of a plurality of different locations.

As explained above, the display system according to the present invention utilizes an adjusting means for reducing the separation between the left and right images. The adjusting means may comprises first and second adjusting means. The first adjusting means may be a means for causing a relative translational motion between the left and right optical member pair and the display section manually or by an electric motor or in some other way, along the far and near direction parallel to the optical median plane and parallel to the common axial plane. The second adjusting means may be a means for producing a movement to vary the left and right optical member separation and/or the left and right object picture separation, in accordance with the translational motion of the first adjusting means. The second adjusting means may take the form of a guiding means such as guide grooves or guide rails, or a cam mechanism, or an electrical means for processing electric picture signals to shift the position of a picture on a display screen.

What is claimed is:

1. A display system comprising:
   a display section including left and right display panels respectively displaying left and right pictures;
   an optical system including a left optical member for producing a left virtual image of said left picture and a right optical member for producing a right virtual image of said right picture; and
   an image adjusting means for adjusting the positions of the left and right display panels of said display section with respect to said left optical member and said right optical member so as to minimize a separation between the left and right virtual images, in response to a change in a distance between said optical system and said display section so that the left and right virtual images remain substantially coincident;
   wherein said image adjusting means includes a means for moving said left and right virtual images of said left and right pictures along at least one of a left and right direction, a far and near direction and an up and down direction; and
   wherein said left and right direction and said far and near direction are perpendicular to each other and parallel to an imaginary common axial plane containing both of a left optical axis of said left optical member and a right optical axis of said right optical member, and wherein said up and down direction is perpendicular to said common axial plane.

2. A display system according to claim 1, wherein said left optical member defines a left optical axis, and said right optical member defines a right optical axis which intersects said left optical axis at an intersection point, and said adjusting means includes a means for positioning said left and right virtual images coincidentally at a common image position which is away from said intersection point.

3. A display system comprising:
   a display section including left and right display panels respectively displaying left and right pictures;
   an optical system is a binocular system including a left optical member for producing a left virtual image of said left picture and a right optical member for producing a right virtual image of said right picture; and
   an image adjusting means for adjusting the positions of the left and right display panels of said display section with respect to said left optical member and said right optical member so as to minimize a separation between the left and right virtual images, in response to a change in a distance between said optical system and said display section so that the left and right virtual images remain substantially coincident; and
   wherein said image adjusting means comprises a first adjusting means for varying a left object distance of the left picture from said left optical member and a right object distance of the right picture from said right optical member, and a second adjusting means for varying an arrangement of the positions of said left and right optical members and said left and right pictures in dependence on said left and right object distances.

4. A display system according to claim 3, wherein each of said left and right optical members comprises an ocular optical member which is one of a lens and a curved mirror, a focal distance of said left optical member is equal to a focal distance of said right optical member, and said left and right optical members are arranged in a manner of bilateral symmetry with respect to an imaginary optical median plane; wherein said first adjusting means comprises a first parameter varying means varying said left object distance and said right object distance while holding said left object distance and said right object distance equal to each other; and wherein said second adjusting means includes a means for reducing at least one of a left and right image separation which is a distance between said left and right virtual images along an imaginary lateral line perpendicular to said optical median plane and a far and near image separation which is a distance between said left and right virtual images along an imaginary longitudinal line parallel to said optical median plane.

5. A display system according to claim 4, wherein said second adjusting means comprises a second parameter varying means for varying positions of said left and right optical members and said left and right pictures so as to vary a separation ratio, which is a ratio of a left and right object separation which is a distance between the left and right pictures, to a left and right optical member separation which is a distance between said left and right optical members.

6. A display system according to claim 5, wherein said second parameter varying means includes a means for increasing said separation ratio when said left and right object distances are increased by said first parameter varying means, and for decreasing said separation ration when said left and right object distances are decreased.

7. A display system according to claim 4, wherein said second adjusting means comprises a second parameter varying means for varying a second parameter in dependence on a first parameter, said first parameter is one of said left object distance and said right object distance which are held equal to each other, and said second parameter is one of a left and right object separation which is a distance between the left and right pictures, and a left and right optical member separation which is a distance between the left and right optical members.

8. A display system according to claim 7, wherein said display section comprises a left display device for producing said left picture on a left screen which is held perpendicular to a left optical center line defined by a left optical axis of said left optical member, and a right display device for producing said right picture on a right screen which is held perpendicular to a right optical center line defined by a right optical axis of said right optical member; and wherein said left and right optical axes are coplanar and lie in an imaginary common axial plane, and said left and right screens are arranged in a manner of bilateral symmetry with respect to an imaginary display median plane.

9. A display system according to claim 8, wherein said image adjusting means further comprises a third adjusting means for moving said left and right virtual images in a direction parallel to an imaginary plane perpendicular to said optical median plane, relative to said optical system while said first and second parameters remain unchanged.

10. A display system according to claim 8, wherein said left and right optical axes of said left and right optical members are parallel to each other, said left optical member comprises a principal point lying on a predetermined imaginary common principal plane and a focal point lying on a predetermined common focal plane, and said right optical member comprises a principal point lying on said common principal plane and focal point lying on said common focal plane.

11. A display system according to claim 10, wherein said second parameter varying means comprises a left and right display separation varying means for decreasing a left and right display separation as said first parameter decreases, and said left and right display separation is a distance between said left and right display devices.

12. A display system according to claim 11, wherein said left and right display separation varying means comprises a left guide member for guiding said left display device along a left straight line segment connecting a left focal point of said left optical member to a common point lying on said common principal plane, and a right guide member for guiding said right display device along a right straight line segment connecting a right focal point of said right optical member and said common point.

13. A display system according to claim 12, wherein said image adjusting means comprises a third adjusting means for moving said common point along a straight line passing through both of said principal points of said left and right optical members.

14. A display system according to claim 11, wherein said left guide member comprises an upper left guide wire having a far wire portion held on said common focal plane just above said focal point of said left optical member and a near wire portion held on said common principal plane just above said common point, and a lower left guide wire having a far wire portion held on said common focal plane just below said focal point of said left optical member and a near wire portion held on said common principal plane just below said common point, and said right guide member comprises an upper right guide wire having a far wire portion held on said common focal plane just above said focal point of said right optical member and near wire portion held on said common principal plane just above said common point and a lower right guide wire having a far wire portion held on said common focal plane just below said focal point of said right optical member and a near wire portion held on said common principal plane just below said common point, said upper and lower left guide wires and said upper and lower right guide wires all extend in parallel to said common axial plane, and wherein said third adjusting means comprises a cross guide member extending in said common principal plane in parallel to a straight line connecting said principal points of said left and right optical members, and a slide member slidably mounted on said cross guide member and holding said near wire portions of said left and right guide wires.

15. A display system according to claim 14, wherein said second parameter varying means comprises a left and right picture separation varying means for varying a left and right picture separation which is a distance between the left picture on the left screen and the right picture on the right screen by moving at least one of the position of the left picture relative to the left screen and the position of the right picture relative to the right screen.

16. A display system according to claim 8, wherein said left and right picture separation varying means comprises an electric adjusting circuit for shifting the position of a left picture frame of the left picture relative to said left screen, and the position of a right picture frame of the right picture relative to said right screen while said left picture frame and said right picture frame remain symmetrical with respect to said display median plane.

17. A display system according to claim 8, wherein said second parameter varying means comprises a left and right optical member separation varying means for moving said left and right optical members, respectively, along left and right curved grooves which are symmetrical with respect to said optical median plane and which are so curved that said left and right optical member separation increases as said first parameter decreases.

18. A display system according to claim 8, wherein said second parameter varying means comprises an angular separation varying means for moving an intersection point at which said left and right optical axes of said left and right optical members intersect each other, by moving one of said left and right optical axes in a manner wherein an angle defined between said left and right optical axes is varied.

19. A display system according to claim 8, wherein said optical system further comprises a half mirror through which said the and right virtual images are viewed.

20. A display system according to claim 19, wherein said optical system further comprises an optical filter disposed behind said half mirror so that an outside can be viewed through said half mirror and said optical filter.

21. A display system according to claim 19, wherein each of said left and right optical members is a magnifying lens, said half mirror is inclined with respect to said common axial plane containing both of said left and right optical axes, and said left and right optical members are disposed between said half mirror and said display section.

22. A display system according to claim 19, wherein each of said left and right optical members is a concave mirror, wherein said half mirror is inclined with respect to said common axial plane, and placed in front of said left and right optical members so that said half mirror produces virtual images, wherein said left optical center line is collinear with a virtual optical axis of said virtual image of said left optical member, said right optical center line is collinear with a virtual optical axis of said virtual image of said right optical member, and wherein said half mirror is optically interposed between said display section and said virtual images.

23. A display system according to claim 8, wherein said display system comprises a wearable head member on which said display section and said optical system are mounted, and a portable display control unit for controlling said left and right display devices, and wherein each of said left and right display devices is a liquid crystal display panel.

24. A display system according to claim 23, wherein said display system comprises a casing enclosing said display section and said optical system, and comprising a window in which an optical filter having a variable transmittance is fitted.

25. A display system according to claim 3, wherein the left optical member and the right optical member respectively comprise left and right lenses which are arranged so as to lie on a common principal plane; and wherein said image adjusting means includes: oblique guide members on which the left and right display panels are slidably supported so as to lie on a common object plane and to be movable toward and away from said left and right lenses; and slide means, movable in a direction parallel to the common principal plane and connected to said slide means, for enabling said display panels to be moved laterally in a direction parallel to the common object plane so that a spatial relationship between said left and right lenses and said left and right display panels is maintained in a manner wherein virtual images which result from the images produced by said left and right display panels, remain substantially coincident.

26. A display system according to claim 3, wherein the left and right display panels are arranged in a common object picture plane; wherein the left and right lenses are laterally arranged; and wherein said image adjusting means includes guide support means comprising a plurality of oblique guide members for suspending the left and right display panels so that the left and right panels may simultaneously slide along the oblique guide members in a side-by-side relationship in a manner wherein, as the distance between said left and right display panels and said left and right lenses increases, the distance between the left and right display panels decreases in a manner wherein virtual images, observed through said left and right lenses, remain in a predetermined coincident relationship and do not separate in response to a change in distance between said left and right display panels and said left and right lenses.

27. A display system according to claim 26, wherein said guide members comprise tensely stretched wires.

28. A display system according to claim 26, further comprising adjusting means for supporting ends of the guide members proximate said left and right lenses in a manner wherein the ends of said guide members can be selectively moved with respect to said left and right lenses in a direction parallel to the common object picture plane.

29. A display system according to claim 28, wherein said adjusting means comprises a laterally extending guide wire on which slide means to which the end of said suspension wires are connected, is slidable.

30. A display system as set forth in claim 3, wherein the left and right display panels are supported on a common object plane; wherein the left and right optical members respectively comprise left and right lens which are supported on a common principal plane; wherein said image adjusting means comprises: curved guide grooves for moving said left and right lenses along mirror image curved paths while maintaining said left and right lenses on said principle plane and for maintaining virtual images, resulting from images produced by said left and right display panels, essentially coincident with one another; and means for moving said curved guide grooves and said left and right lenses in a direction parallel to the common principle plane.

31. A display system as set forth in claim 3, wherein the left and right display panels are laterally arranged side-by-side in a common object picture plane; wherein the optical system includes a half-mirror, and the left and right optical members comprise left and right concave mirrors which are arranged with respect to said half-mirror so as to reflect left and right pictures which are produced by said left and right display panels and which are reflected off said half-mirror, back through said half mirror in a manner which creates left and right virtual images; and wherein said image adjusting means includes oblique guide members along which said left and right display panels are slidable, for guiding said left and right display panels so that respective centers of said left and right display panels are selectively movable along straight lines which interconnect a common point and left and right reflected focal points which respectively lie on left and right reflected optical axes that respectively intersect left and right optical axes which pass through said half-mirror and left and right reflected principal point which lie on left and right optical axes on which said left and right concave mirrors are respectively located, said common point being selectively movable along a line which passes through left and right reflected principal point which respectively lie on the left and right optical axes, said adjustment mechanism means being effective to enable the left and right virtual images to be held coincident when said left and right display panels are moved along said oblique guide members in a manner which changes the positions of said virtual images.

32. A display system comprising: a display section including left and right display panels respectively displaying left and right pictures; an optical system including a left optical member for producing a left virtual image of said left picture and a right optical member for producing a right virtual image of said right picture; and an image adjusting means for adjusting the positions of the left and right display panels of said display section with respect to said left optical member and said right optical member so as to minimize a separation between the left and right virtual images, in response to a change in a distance between said optical system and said display section;

wherein said left optical member has a left optical axis, and said right optical member a right optical axis which is parallel to said left optical axis; and wherein said display section comprises left and right display panels, and said image adjusting means includes a means for holding said left display panel perpendicular to the left optical axis and centered at a position away from the left optical axis, and holding said right display panel perpendicular to the right optical axis and centered at a position away from the right optical axis.

33. A display system according to claim 32, wherein said image adjusting means includes a means for causing said display section and said optical system to produce said left and right virtual images in one of first and second regions which are spaced apart from each other, and for maintaining the separation between a center of said left image and a center of said right image constant regardless of whether the left and right images are produced in said first region or in said second region.

* * * * *